United States Patent [19]

Kinoshita et al.

[11] Patent Number: 5,402,740
[45] Date of Patent: Apr. 4, 1995

[54] VEHICULAR MACHINE FOR TRANSPLANTING VEGETAL SEEDLINGS

[75] Inventors: Eiichiro Kinoshita; Shin Watanabe; Yoshikatsu Aoki; Kazuyuki Suzuki; Masahiro Takemoto; Tamaki Kubo; Norihiro Yano, all of Ehime, Japan

[73] Assignee: Iseki & Co., Ltd., Matsuyama, Japan

[21] Appl. No.: 834,249

[22] PCT Filed: Jun. 24, 1991

[86] PCT No.: PCT/JP91/00847
§ 371 Date: Mar. 26, 1992
§ 102(e) Date: Mar. 26, 1992

[87] PCT Pub. No.: WO92/00001
PCT Pub. Date: Jan. 9, 1992

[30] Foreign Application Priority Data

| Jun. 22, 1990 | [JP] | Japan | 2-165411 |
| Mar. 19, 1991 | [JP] | Japan | 3-082047 |
| Apr. 19, 1991 | [JP] | Japan | 3-116947 |
| Apr. 19, 1991 | [JP] | Japan | 3-116948 |
| Jun. 10, 1991 | [JP] | Japan | 3-166386 |
| Jun. 10, 1991 | [JP] | Japan | 3-166387 |
| Jun. 10, 1991 | [JP] | Japan | 3-166388 |

[51] Int. Cl.$^6$ ............................................. A01C 11/02
[52] U.S. Cl. ........................................ 111/105; 172/125; 414/508; 111/921; 111/926
[58] Field of Search ............... 111/104, 105, 100, 921, 111/922, 926, 927, 103, 109; 414/508; 280/411.1, 408; 172/125

[56] References Cited

U.S. PATENT DOCUMENTS

| 2,940,534 | 6/1960 | Chattin | 172/125 |
| 3,028,919 | 4/1962 | Smith et al. | 172/125 |
| 3,729,400 | 10/1966 | Gonzalez | 111/109 |
| 4,289,080 | 9/1981 | Penley | |
| 4,438,710 | 3/1984 | Paladino | 111/926 |
| 4,663,714 | 5/1987 | Cornell et al. | 475/82 |
| 4,793,430 | 12/1988 | Stephenson et al. | 172/125 |
| 5,099,706 | 3/1992 | Irvin | 74/63 |
| 5,121,701 | 6/1992 | Reed et al. | 111/105 |
| 5,129,869 | 7/1992 | Sagata et al. | 475/193 |

FOREIGN PATENT DOCUMENTS

| 57-16411 | 4/1982 | Japan . | |
| 188278 | 8/1986 | Japan | 111/100 |
| 8874 | 1/1987 | Japan | 111/100 |
| 96178 | 5/1987 | Japan | 111/100 |

Primary Examiner—Randolph A. Reese
Assistant Examiner—Spencer Warnick
Attorney, Agent, or Firm—Armstrong, Westerman, Hattori, McLeland & Naughton

[57] ABSTRACT

A vehicular machine available for transplanting vegetal seedlings onto seedbed lines comprising; a planting unit which is furnished with a plurality of vegetal seedling mounting tables and planting levers for transplanting vegetal seedlings onto seedbed lines supplied from these mounting tables disposed on the back side of a working truck hauled by a tractive vehicle; and a working step which facilitates an operator to mount himself on the working truck in order to replenish vegetal seedlings to respective mounting tables of the planting unit. The working truck itself is held by a plurality of supporting wheels which are respectively aligned with the level line identical to that of those wheels of the tractive vehicle.

10 Claims, 26 Drawing Sheets

VEHICULAR MACHINE FOR TRANSPLANTING VEGETAL SEEDLINGS

FIELD OF THE INVENTION

The present invention relates to a vehicular machine which is available for transplanting vegetal seedlings onto plural seedbed lines by hauling an integrated planting unit by means of a tractive vehicle.

DESCRIPTION OF THE BACKGROUND ART

A prior art discloses such a vehicular machine available for transplanting vegetal seedlings onto plural seedbed lines, which consists of those components mounted on a working truck hauled by a tractive vehicle including the following; a seedling mounting table, a plurality of planting levers for simultaneously transplanting those vegetal seedlings mounted on the table onto multiple seedbed lines, and a working step which is provided on a working truck to permit a seedling-replenishing operator to mount on it so that he can sequentially replenish vegetal seedings onto the seedling mounting table containing decreased amount of vegetal seedlings.

Nevertheless, such a conventional vehicular machine available for transplanting vegetal seedlings onto multiple seedbed lines cited above still has problems to solve including the following:

The first problem is caused by the structure of the working truck which is easily movable in the vertical direction. Generally, vegetal seedlings are planted on such wide and plane field which is roughly plowed by operating a vehicular machine for transplanting vegetal seedlings like the one cited above. Since the working truck is obliged to follow up rolling on unlevelled ground surface, the working step constantly swings itself, thus obliging the seedling replenishing operator to follow up the replenishing work with unstable posture. Furthermore, since the operating system is designed to control pitching and rolling of the planting unit based on the level of the working truck, vegetal seedlings cannot properly be transplanted with constant depth.

The second problem is caused by excessively high position of the working step. Normally, a transmission shaft is disposed below the working step in order to transmit drive force from the front part of the working truck to the planting unit. Nevertheless, in order to align the height of the PTO shaft of the tractive vehicle with the height of the drive-power receiving unit of the working truck, the conventional vehicular machine cited above installs the working step at such a height position relatively aloft from the ground surface. In consequence, operator inconveniently mounts and dismounts himself on and from the working step, and yet, the height position of the seedling mounting table is too low from the operator's seat on the working step. As a result, the operator incurs much inconvenience when replenishing vegetal seedlings to the mounting table.

The third problem is caused by those reasons cited below. The owner of the vehicular machine in subject is likely to make use of a conventional general-purpose tractor owned by himself as the tractive vehicle. In this case, since the speed range of those conventional general-purpose tractors differs from each other according to manufacturers and models, if the operator drives the planting unit with drive force output from the PTO shaft of a conventional tractor, then, the speed of the tractor cannot correctly match the number of the rotation of the drive shaft of the planting unit, and in consequence, constant intervals between planted vegetal seedlings cannot be secured. Likewise, if gears of the PTO shaft were incorrectly shifted, those vegetal seedlings cannot properly be transplanted at constant intervals.

The forth problem is caused by those reasons cited below. The planting unit of the above conventional vehicular machine available for transplanting vegetal seedlings has the structure described below. Concretely, the seedling mounting table is installed with slight incline so that the front end can be positioned slightly higher than the rear part. Using a seedling conveying belt, those vegetal seedlings on the mounting table are sequentially delivered to an outlet at the rear end of the planting unit. Then, those plural planting levers respectively transplant vegetal seedlings delivered via the rear outlet while vertically moving themselves according to the predetermined rule. Nevertheless, since these planting levers are positioned behind the seedling outlet, those vegetal seedlings on the mounting table and pot holders (available for holding those seedling-receivers) at the rear end of the seedling mounting table respectively obstruct the operator on the working step to check and confirm if those planting levers are on still posture, or not.

The fifth problem is caused by the function of the seedling conveying belt provided for the seedling mounting table. The seedling conveying belt is engaged with a pair of seedling forwarding rollers comprising a drive roller and a follower roller. As soon as the seedling mounting table arrives at the end of the travelling path by way of reciprocating itself in both directions, those seedling forwarding arms secured to the shafts of the drive-side seedling forwarding roller are rotated in the predetermined direction, and then, the seedling conveying belt moves in the direction of forwarding vegetal seedlings. Actually, a plurality of seedling forwarding rollers on the drive side corresponding to respective seedbed lines are jointly secured to a roller shaft so that all the seedling forwarding belts corresponding to respective seedbed lines can simultaneously rotate themselves.

Nevertheless, it is necessary for the operator to properly adjust positions of all the vegetal seedlings on the way of replenishing them so that no clearance can be generated between those vegetal seedlings which still remain on the mounting table and the replenished vegetal seedlings. Furthermore, if any trouble occurs while those planting levers respectively pick up vegetal seedlings, then the operator needs to properly adjust the positions of vegetal seedlings on the mounting table. If the operator ever displaces the position of vegetal seedlings by carelessly operating any of these seedling forwarding arms, then those vegetal seedlings on the remaining normal seedbed lines are also improperly displaced, thus adversely obstructing the seedling forwarding operation.

The sixth problem arises from such a conventional vehicular machine available for tranplanting vegetal seedlings on multiple seedbed lines. When operating this conventional vehicular machine by installing a plurality of planting units to the front and to the back in order to prevent the adjoining planting units from interfering with each other, since each plant unit terminates the operation to plant those vegetal seedlings at different positions, after completing the whole planting operations, a blank domain devoid of seedling is generated in those seedbed lines corresponding to those planting units disposed in the front of the vehicular machine.

OBJECT OF THE INVENTION

The invention has been achieved to fully solve those problems inherent in the conventional vehicular machine available for transplanting vegetal seedlings on multiple seedbeds.

DISCLOSURE OF THE INVENTION

The vehicular machine available for transplanting vegetal seedlings on multiple seedbed lines embodied by the invention features the following: Basically, the first embodiment of the invention provides a novel vehicular machine available for transplanting vegetal seedlings on multiple seedbed lines, which hauls an integrated planting unit by applying a tractive vehicle. The planting unit is furnished with a plurality of vegetal seedling mounting tables and a plurality of planting levers for transplanting those vegetal seedlings stored on the mounting tables onto the predetermined seedbed lines. Characteristically, the vehicular machine for transplanting vegetal seedlings according to the first embodiment of the invention further comprises the following; a working truck which is hauled by a tractive vehicle, wherein the working truck is supported by a plurality of wheels of the tractive vehicle and a plurality of supporting wheels which are respectively disposed on the level line identical to that of those wheels of the tractive vehicle and behind the tractive vehicle; and a working step which permits an operator (who replenishes vegetal seedlings to those mounting tables of the planting unit) to mount himself on the working truck; and wherein the planting unit is movably installed to the working truck so that it can properly ascend and descend itself based on the data resulted from the operation of a plurality of sensors which are secured to the planting unit and respectively detect the actual height position of seedbed ground surface.

Basically, the second embodiment of the invention provides a novel vehicular machine for transplanting vegetal seedlings on multiple seedbed lines, which is furnished with an integrated planting unit behind a working truck hauled by a tractive vehicle, wherein the planting unit comprises a plurality of seedling mounting tables, a plurality of planting levers which respectively plant those vegetal seedlings stored on those mounting tables onto corresponding seedbed lines, and a working step which is installed on the working truck to permit an operator (who replenishes vegetal seedlings to those mounting tables of the planting unit) to mount himself on the working truck. Characteristically, drive force transmitted from the tractive vehicle to the front of the working truck is provisionally routed in the downward direction before eventually being transmitted to the planting unit by way of under-running the work step.

The third embodiment of the invention provides a novel vehicular machine for transplanting vegetal seedlings onto multiple seedbed lines, which is furnished with an integrated planting unit being hauled and driven by a tractive vehicle. The vehicular machine according to the third embodiment is characteristically provided with a stepless gear-shifting device inside of the route available for transmitting drive force from the tractive vehicle to the planting unit.

The fourth embodiment of the invention provides a novel vehicular machine for transplanting vegetal seedlings onto multiple seedbed lines, which incorporates a plurality of sensors for detecting the number of the rotation of the PTO shaft of the tractive vehicle and a control unit which properly controls operation of a stepless gear-shifting device (provided for the third embodiment) in response to data designating the number of the rotation of the PTO shaft of the tractive vehicle detected and output from these sensors.

The fifth embodiment of the invention provides a novel vehicular machine for transplanting vegetal seedlings on multiple seedbed lines, which is characteristically provided with a plurality of seedling forwarding belts each being engaged with a pair of seedling forwarding rollers comprising a drive roller and a follower roller in correspondence with respective seedbed lines of the seedling mounting table, wherein these seedling forwarding belts are respectively driven by causing those seedling forwarding rollers on the drive side to intermittently rotate themselves in the predetermined direction. Characteristically, the fifth embodiment of the invention provides the drive system with a means for adjusting delivery of vegetal seedlings, wherein this means is capable of moving those seedling forwarding belts by individually rotating those seedling forwarding rollers on the follower side in the predetermined direction.

The sixth embodiment of the invention also provides a novel vehicular machine for transplanting vegetal seedlings on multiple seedbed lines, which is furnished with an integrated planting unit having a drive-force transmission housing, a plurality of seedling mounting tables, and a plurality of planting levers behind a working truck hauled by a tractive vehicle, wherein a working step is provided on a working truck to permit an operator to mount himself on it for replenishing vegetal seedlings to these mounting tables. Characteristically, the planting unit is furnished with a plurality of seedling mounting tables above the drive-force transmission housing and a plurality of planting levers on a planting-lever supporting frame which is extended from the drive-force transmission housing in the upper backward direction.

The seventh embodiment of the invention also provides a novel vehicular machine for transplanting vegetal seedlings, which is furnished with a plurality of planting units respectively being aligned in the horizontal direction and provided with a seedling mounting table and a planting lever available for planting those vegetal seedlings stored on the mounting table onto multiple seedbed lines. These plural planting units are jointly hauled by a tractive vehicle. Characteristically, the vehicular machine for transplanting vegetal seedlings on multiple seedbed lines according to the seventh embodiment of the invention further comprises a means for properly adjusting horizontal intervals between those plural planting units and a means for shifting those planting units back and forth.

DESCRIPTION OF THE PREFERRED EMBODIMENTS

Optimal form for embodying the Invention

Figure 1:
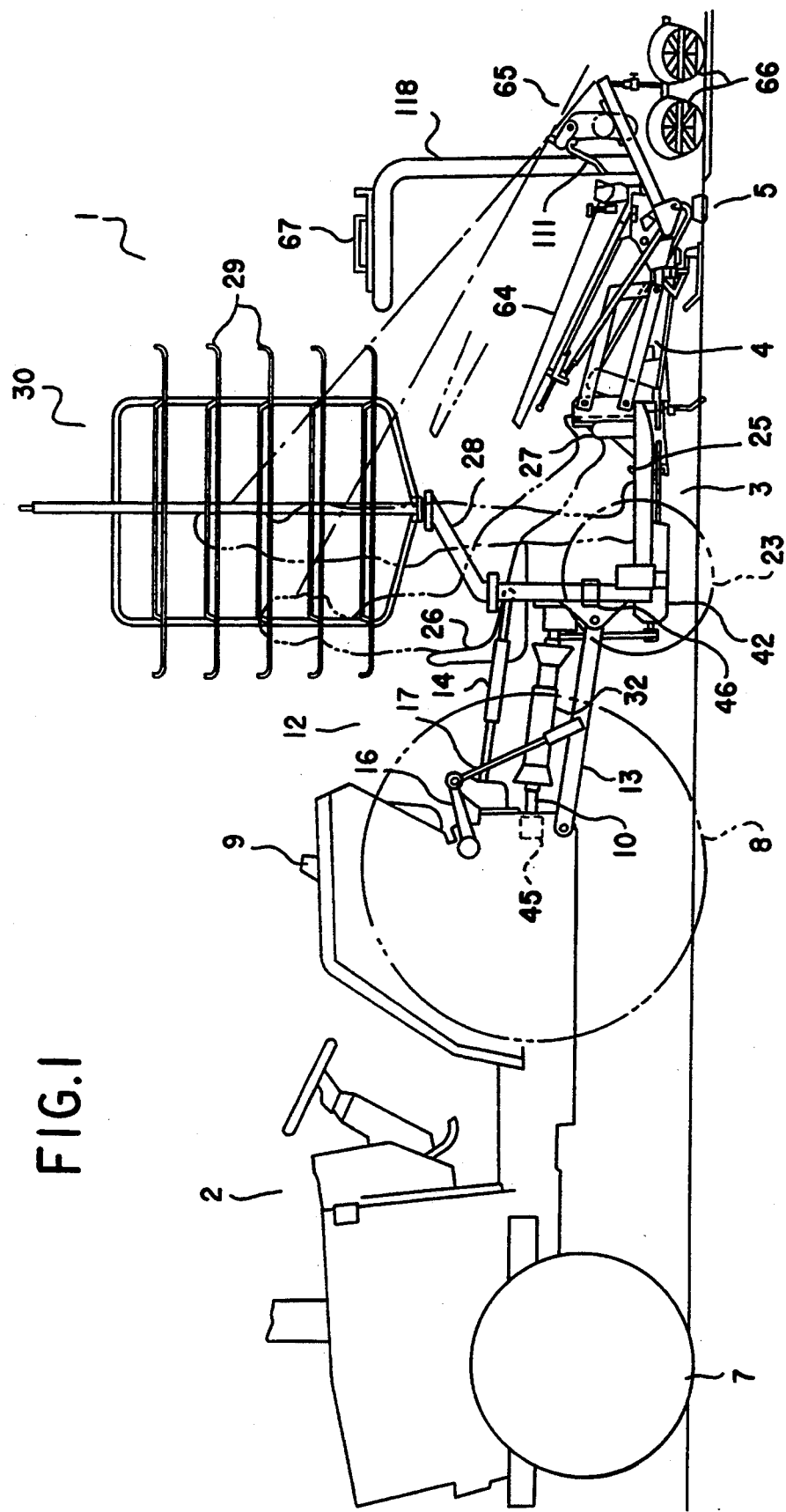
FIG. 1 is the overall lateral view of the vehicular machine available for transplanting vegetal seedlings on seedbed lines according to a preferred embodiment of the invention.

FIG. 1 through FIG. 18 respectively designate a vehicular machine available for transplanting vegetal seedlings on seedbed lines according to an embodiment of the invention, which is effectively made available for transplanting seedlings of lettuse or the like for example. Basically, the vehicular machine for transplanting vegetal seedlings on multiple seedbed lines according to an embodiment of the invention comprises a working truck 3 which is hauled by a tractive vehicle 2 and a planting unit 5 coupled with a parallel linking unit 4 secured to the rear end of the working truck 3. The planting unit 5 is capable of planting vegetal seedlings onto plural seedbed lines (for example, 5 lines as shown in the accompanying drawings).

Independent of manufacturers and models, basically, any conventional tractor may also be made available for the tractive vehicle 2 insofar as it can normally haul and drive the working truck 3 and the planting unit 5. The reference numeral 7 shown in FIG. 1 designates a pair of front wheels, 8 a pair of rear wheels, 9 a driver's seat, and 10 designates a PTO shaft, respectively. The reference numeral 12 designates a 3-P linking unit which consists of a pair of bottom linking members 13 and 13 which are disposed on both sides and a top linking member 14 capable of adjusting its own length. The tip ends of a plurality of rotatable drive arms 16 and intermediate parts of these bottom linking members 13 and 13 are respectively interlocked by a pair of lift rods 17 and 17.

Figure 3:
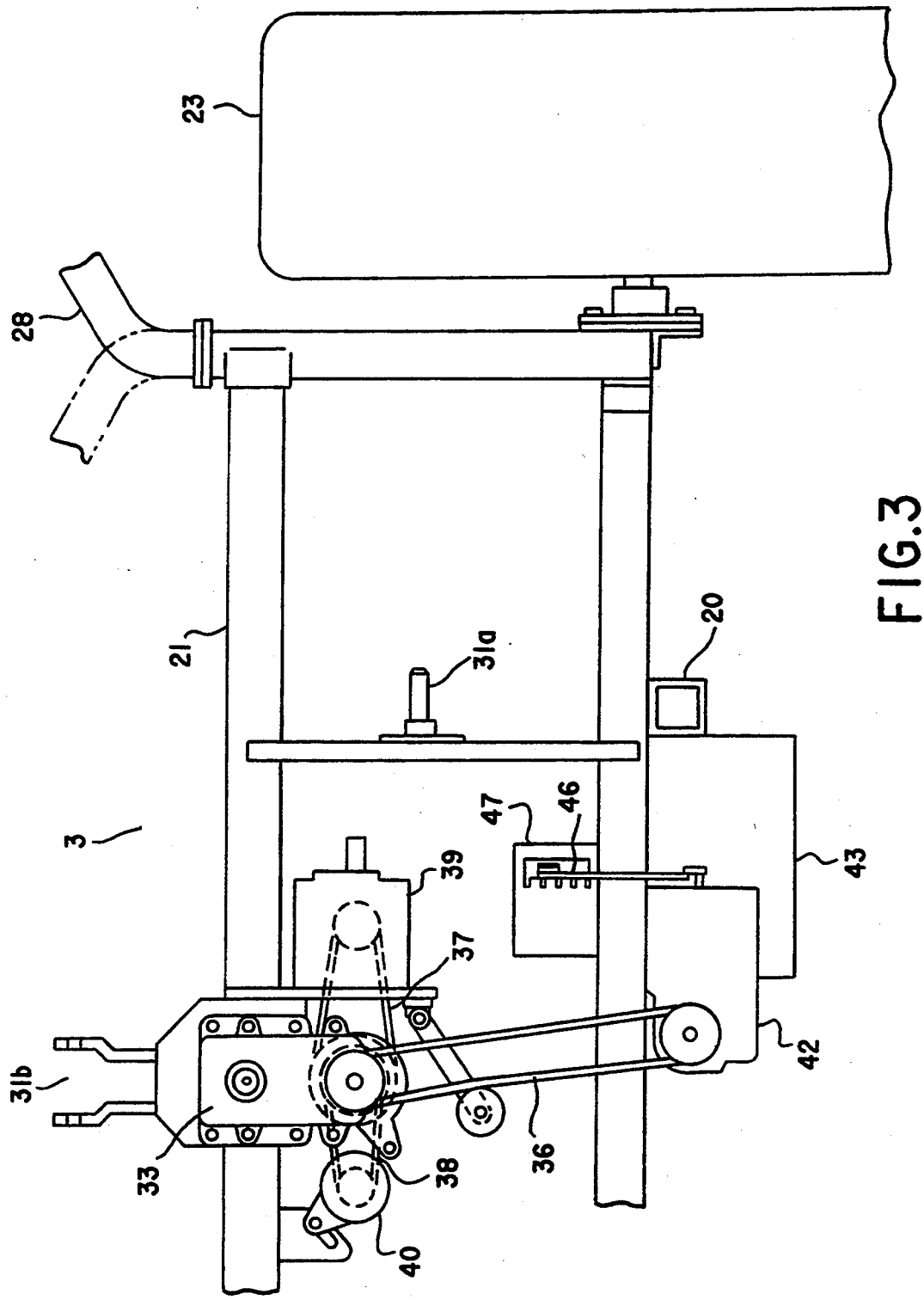
FIG. 3 is the front view of the working truck of the vehicular machine embodied by the invention as shown in FIG. 1.
Figure 4:
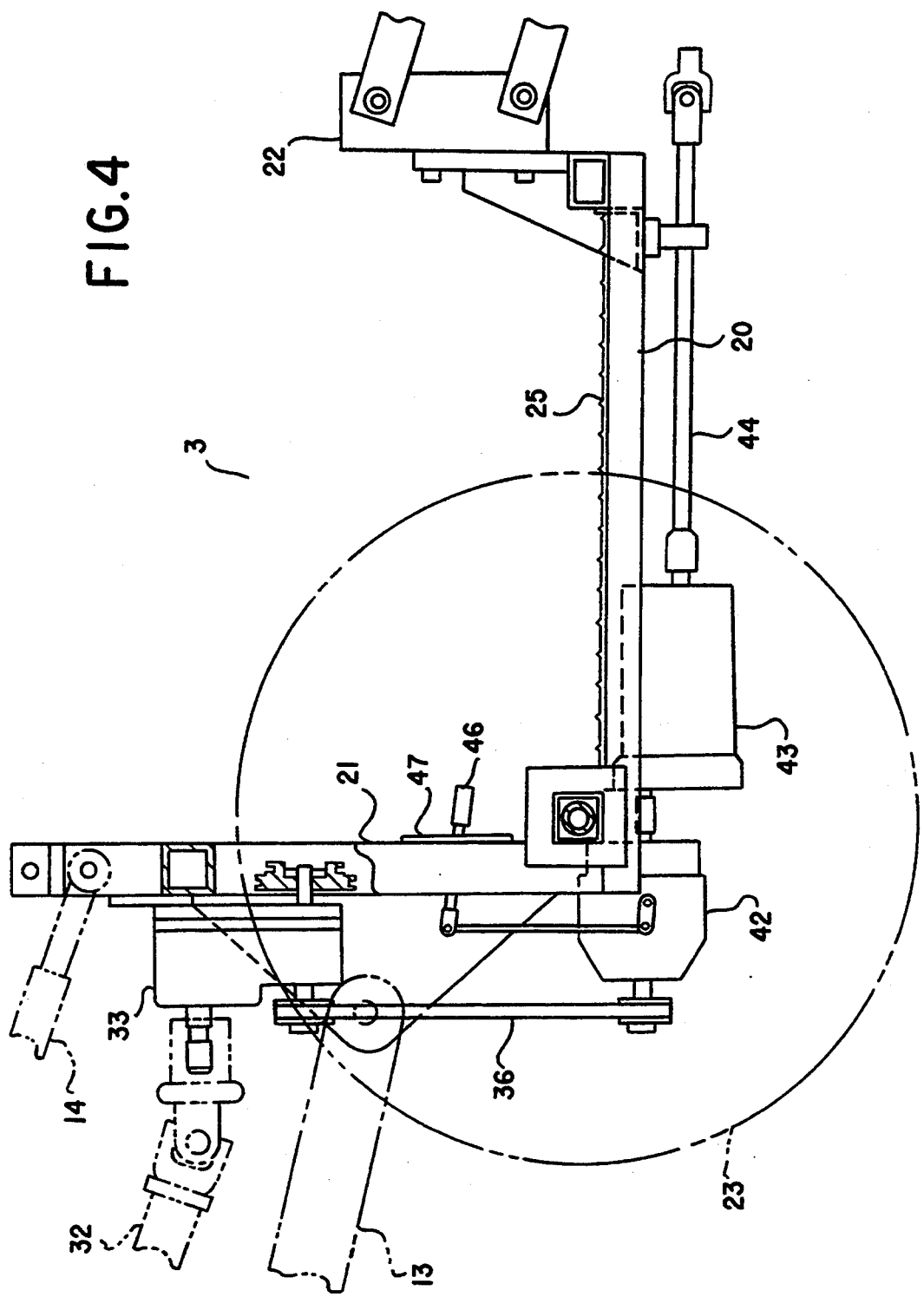
FIG. 4 is the lateral view of the working truck shown in FIG. 3.
Figure 5:
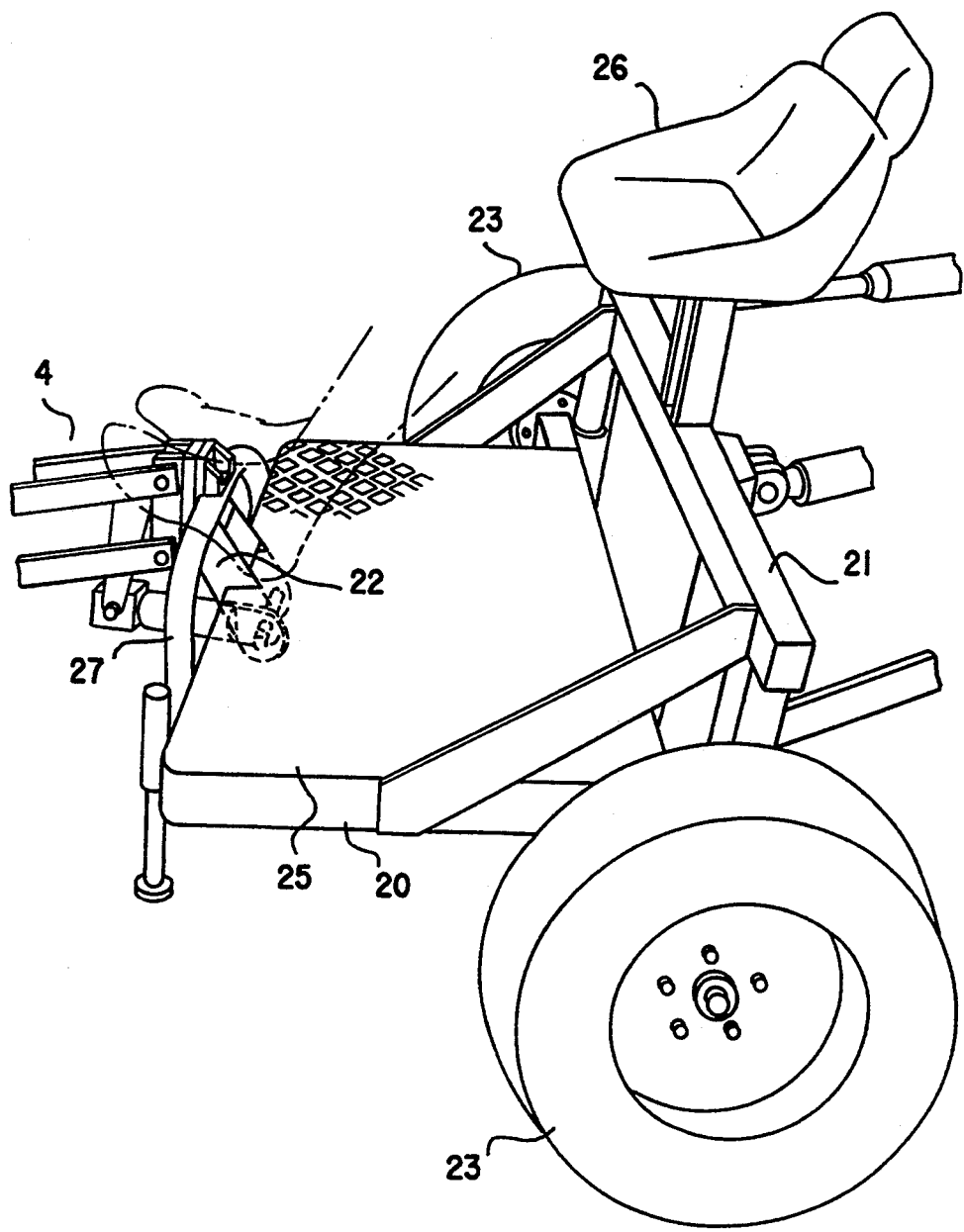
FIG. 5 is the perspective view of those essential components in the periphery of the working step provided for the working truck shown in FIGS. 3 and 4.

As shown in FIG. 3 through FIG. 5, the working truck 3 is composed of the following: A truck frame is provided, which consists of a horizontal frame 20, a front frame 21, and a rear frame 22, which are respectively erected on the front and rear ends of the horizontal frame 20. A pair of truck-body supporting wheels 23 and 23 are provided on both sides of the front frame 21 via a shaft. These truck-body supporting wheels 23 and 23 are respectively aligned on the level line identical to that of the rear wheels 8 and 8 of the tractive vehicle 2, and therefore, when these truck-body supporting wheels 23 and 23 respectively trace the route rolled by those rear wheels 8 and 8, the working truck 3 can smoothly roll on itself without generating substantial pitching. Rear ends of those bottom linking members 13 and 13 of the 3-P linking unit 12 and the rear end of the top linking member 14 are respectively coupled with those linking members 31a, 31, and 31b. This permits the tractive vehicle 2 to smoothly haul the working truck 3.

A working step 25 made of an iron plate is provided on the horizontal frame 20 to permit an operator to mount himself on it for replenishing vegetal seedlings. A stepping member 27 (which is formed in the gate-like shape from the front view and converted from a round pipe) is integrally secured to the rear frame 22. As shown in FIG. 1 and FIG. 5, when the operator sits himself on the seat 26, he can place his feet on the stepping member 27. Availing of this, the seedling replenishing operator can remain at ease even when confining himself in narrow space of the working step 25. A pair of rods 28 and 28 available for supporting those reserved seedling mounting tables are rotatably installed in horizontal phase by way of projecting themselves from the the right and left sides of the front frame 21 in the upward inclined direction. These supporting rods 28 and 28 respectively support a plurality of reserved seedling mounting tables 30 through 30n each containing plural shelves 29 for mounting plural seedling containers on those rods 28 and 28. When these reserved seedling mounting tables 30 through 30n are turned in the backward direction, part of these reserved seeding mounting tables 30 visually overlaps with part of the planting unit 5 in front of those seeding mounting tables 64 described later on when the operator views them from the top. Therefore, the operator needs to properly control the height of these reserved seedling mounting tables 30 so that these reserved seedling mounting tables 30 can respectively be prevented from coming into contact with the lifted planting unit 5. Concretely, in order to contract the total length of the working truck 3 and the planting unit 5, part of these reserved seedling mounting tables 30 and part of the planting unit 5 visually overlaps when viewing them from the top.

Rotating force transmitted from the PTO shaft 10 via a universal joint 32 is then transmitted to a drive-force input housing 33 which is provided above the front frame 21. The drive-force input housing 33 incorporates a plurality of gears. The transmitted drive force is then extracted by shifting the gear speed based on the predetermined gear-shifting ratio. Drive force output from the drive-force input housing 33 is then provisionally transmitted in the downward direction via a drive-force transmission belt 36, and then, drive force is routed to an oil-pressurized pump 39 and an alternator 40 secured to both sides of the drive-force input housing 33 via those drive-force transmission belts 37 and 38. Next, drive force provisionally transmitted in the downward direction to drive the planting unit 5 then passes through a stepless gear-shifting device (HST) 42 and a clutch housing 43 before eventually being transmitted to the rear end of the working truck 3 via a drive shaft 44 of the planting unit 5 installed below the working step 25. The clutch housing 43 incorporates a planting clutch which causes the planting unit 5 to constantly stop at the predetermined position and a security clutch which shuts off-transmission of drive force as soon as the planting unit 5 receives load beyond the predetermined amount.

Figure 6:
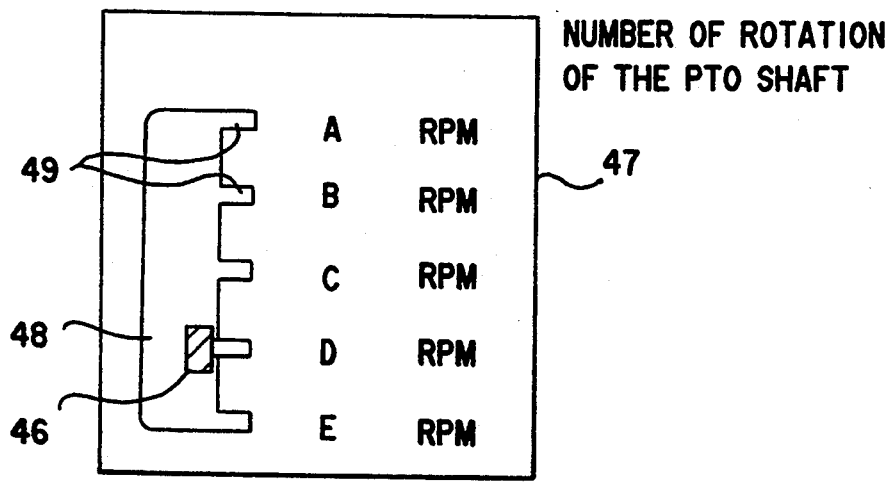
FIG. 6 is the front view of a guide plate provided for the gear-shifting lever.

The stepless gear-shifting device HST 42 properly adjusts the number of the rotation of the-drive shaft of the planting unit 5. The stepless gear shifting device HST 42 steplessly shifts the gear speed by operating a gear-shifting lever 46 to vary angle of those tilted plates of the HST 42. When operating a tractor, actually, the number of the rotation of the PTO shaft is often restrained to several aspects of the number of the rotation, and therefore, it is convenient for the tractor operator to predetermine the operating position of the gear shifting lever 46 in accordance with those several aspects of the number of the rotation of the PTO shaft. FIG. 6 illustrates a guide plate for operating the gear shifting lever 46. A plurality of engaging parts 49 are provided for specific positions of a guide groove 48 of the guide plate 47 in order to properly engage the gear shifting lever 46 with the selected position of the guide groove 48 in correspondence with the number of the rotation of the PTO shaft 10. The number of the rotation of the PTO shaft 10 is expressed in terms of a range from A to E.

Figure 7:
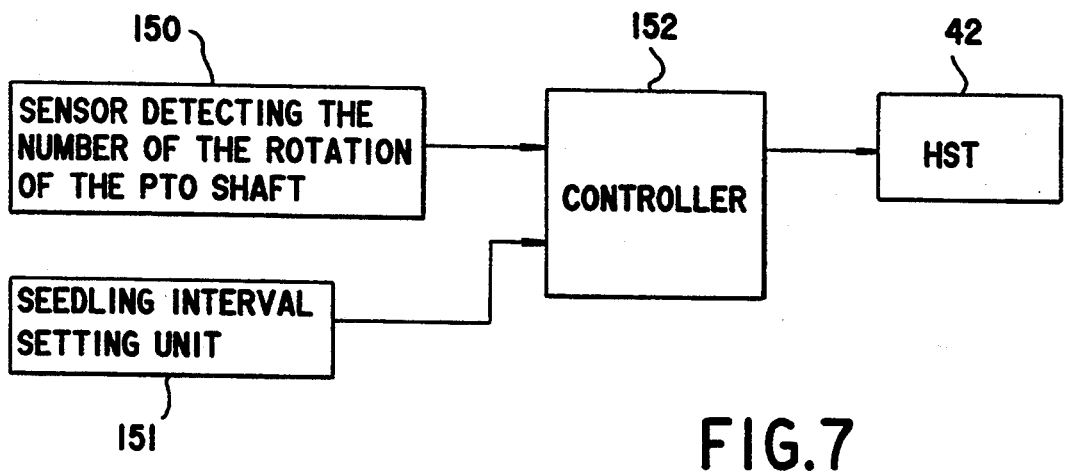
FIG. 7 is the simplified block diagram of the HST control system introduced to the vehicular machine embodied by the invention.

In place of controlling the number of the rotation of the PTO shaft 10 by operating the manual gear-shifting lever 46, as shown in the block diagram of FIG. 7, the number of the rotation of the PTO shaft 10 may automatically be controlled Concretely, a sensor available for detecting the number of the rotation of the PTO shaft 10 and a seedling interval setting unit 151 respectively output signals to a controller 152. The controller 152 then outputs control signal to the stepless gear-shifting device HST 42. The controller 152 continuously regulates the relationship between the number of the rotation of the PTO shaft 10 and the number of the rotation of the planting unit 5 constant, and yet, correctly maintains the interval between each vegetal seedling to be planted as per the interval value established by the seedling interval setting unit 151. When introducing the above automatic control system to properly control the relationship between the number of the rotation of the PTO shaft 10 and the number of the rotation of the planting unit 5 constant, even when gears of the PTO shaft 10 are incorrectly shifted, intervals between those vegetal seedlings remain invariable.

As mentioned earlier, drive force transmitted to the drive force input housing 33 is provisionally transmitted in the downward direction via the drive force transmission belt 36 before being transmitted to the rear end of the working truck 3 via the drive shaft 44 of the planting unit 5 below the working step 25. As a result, the working step 25 can descend its position to permit the operator to easily mount himself on it and dismount himself from it.

As shown in FIG. 3 and FIG. 4, when viewing those important components including the drive force input housing 33, the oil-pressurized pump 39, and the alternator 40, from the front position, these components are respectively disposed in a range surrounded by those link connection members 31a, 31a, and 31b. By virtue of this arrangement, the front ends of these important components are fully protected by those bottom linking members 13 and 13 and the top linking member 14. Even though any obstacle were present between a pair of the truck supporting wheels 23 and 23 while the working truck 3 moves on, these important components can securely be prevented from incurring unwanted damage otherwise caused by collision with an obstacle.

Figure 8:
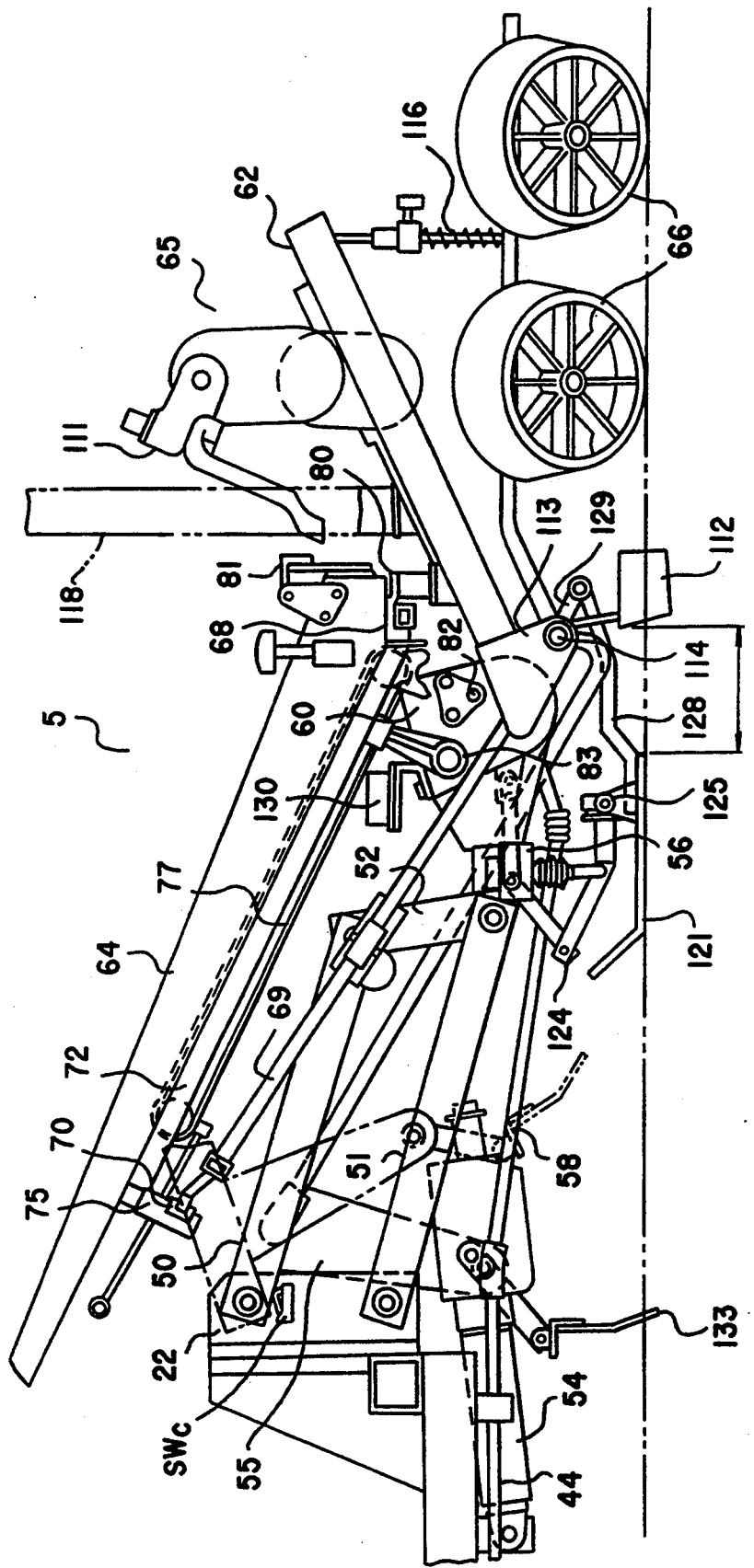
FIG. 8 is the lateral view of the integrated planting unit of the vehicular machine embodied by the invention.
Figure 9:
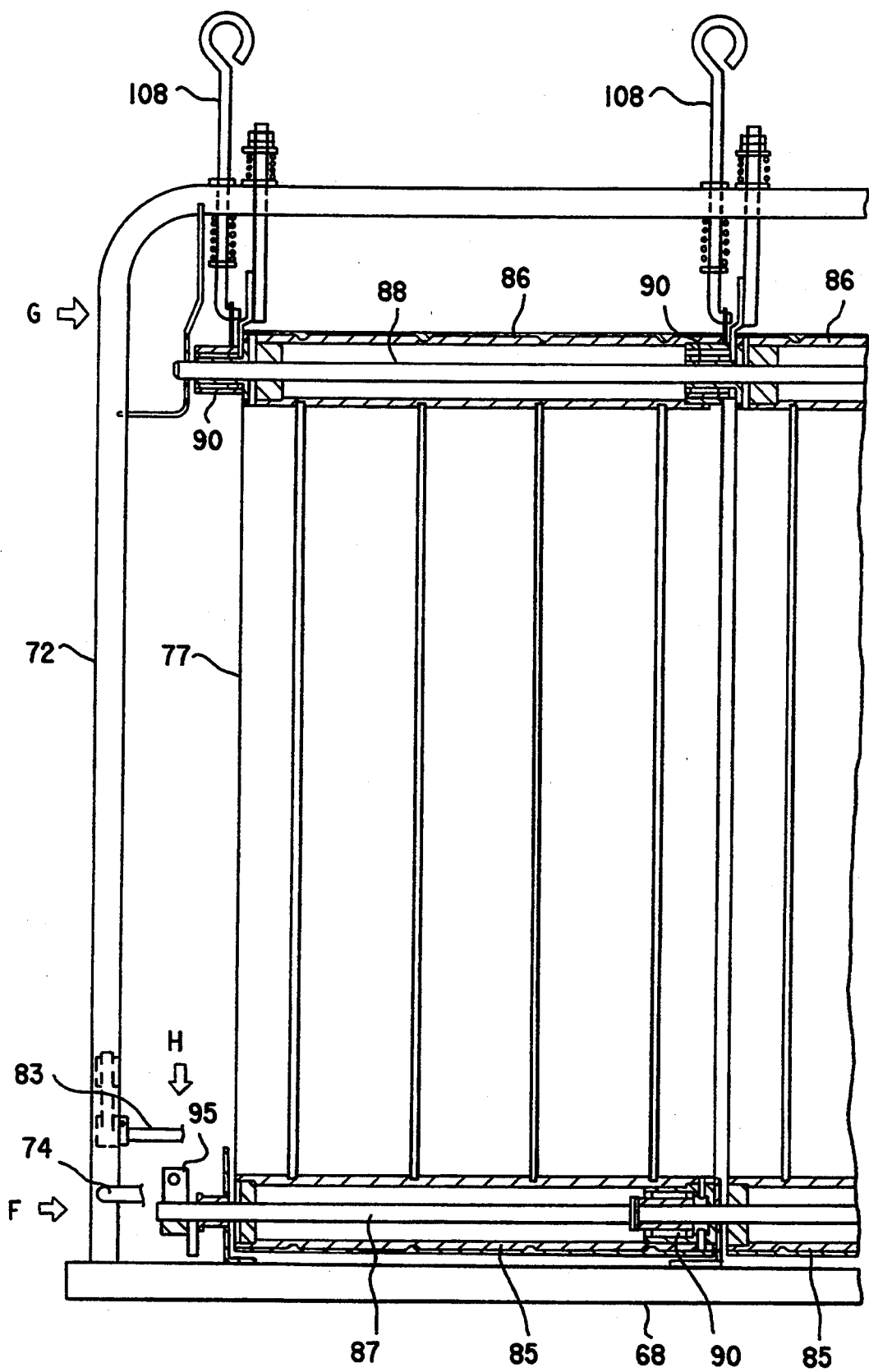
FIG. 9 is the plane sectional view of the seedling forwarding belt installation mechanism embodied by the invention.
Figure 10:
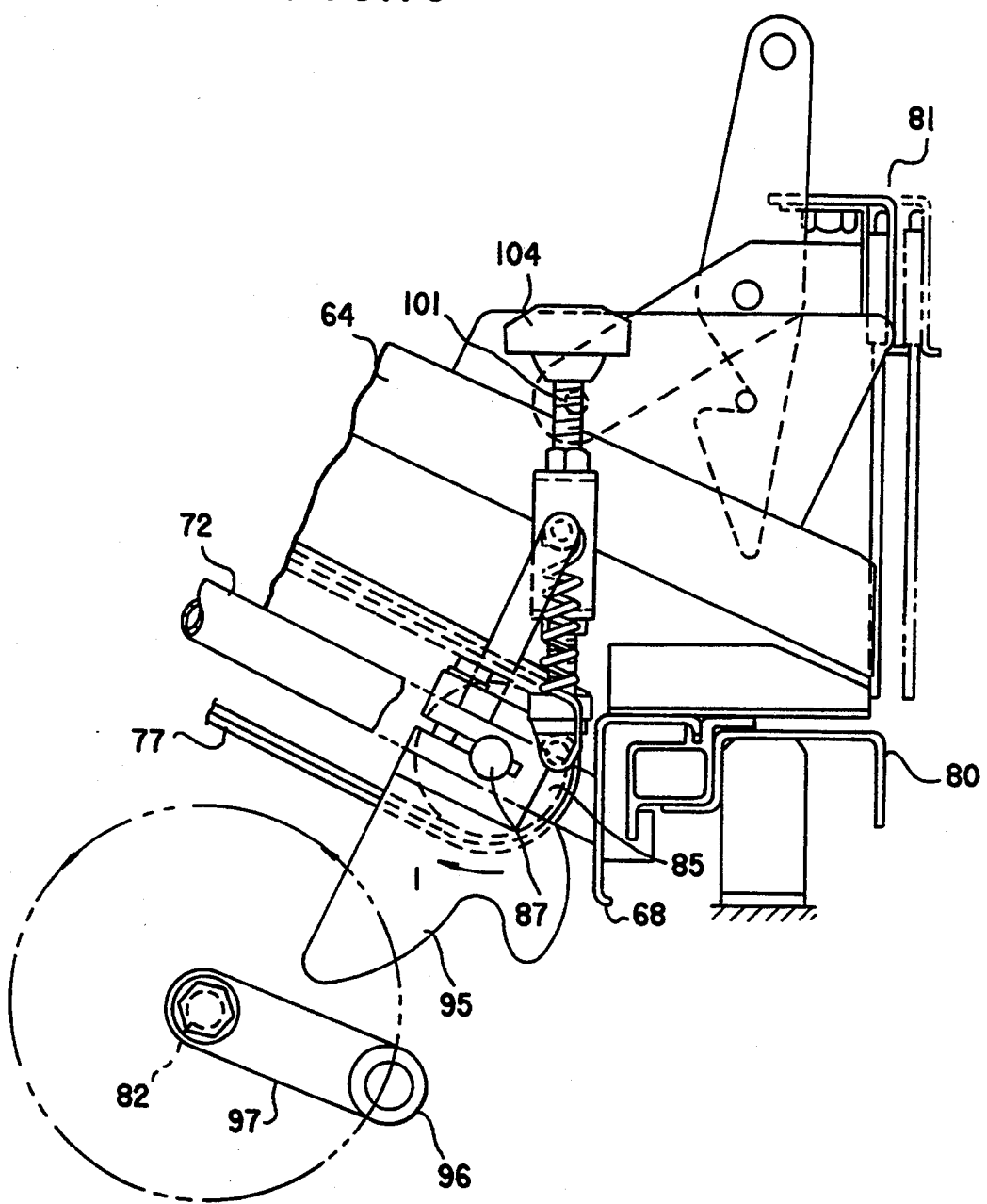
FIG. 10 is the partial diagram of the seedling forwarding belt installation mechanism as per the arrowed line "F" shown in FIG. 9.
Figure 11:
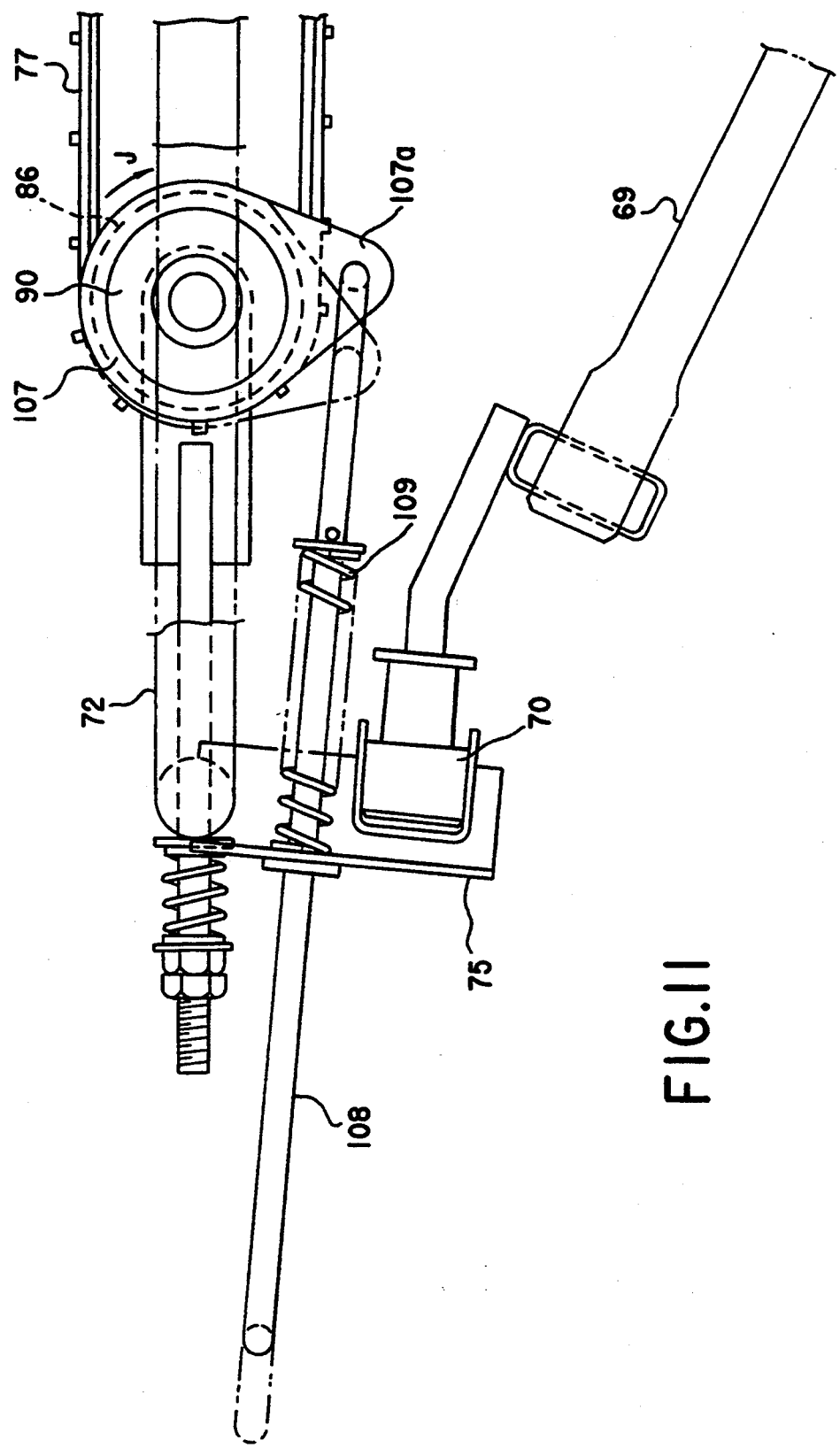
FIG. 11 is the partial diagram of the seedling forwarding belt installation mechanism as per the arrowed line "G" shown in FIG. 9.

As shown in FIG. 8, the parallel linking unit 4 is composed of the rear frame 22, a pair of upper linking members 50 and 50, a pair of lower linking members 51 and 51 respectively being secured to the rear frame 22 by way of freely rotating themselves, and a connecting frame 52 which is connected to the rear ends of those upper and lower linking members 50 and 51. The planting unit 5 is rotatably connected to the connecting frame 52 by means of a rolling shaft within phase orthogonal to the moving direction. A piston rod of a pitching cylinder 54 having the base connected to the horizontal frame 20 is coupled with the tip end of a swinging arm 55 which vertically extends itself from a pair of the upper linking members 50 and 50. The planting unit 5 ascends and descends itself by effect of the elongation and contraction of the pitching cylinder 54. An oil-pressurized valve 56 of the planting unit 5 properly controls operation of the pitching cylinder 54.

Figure 12:
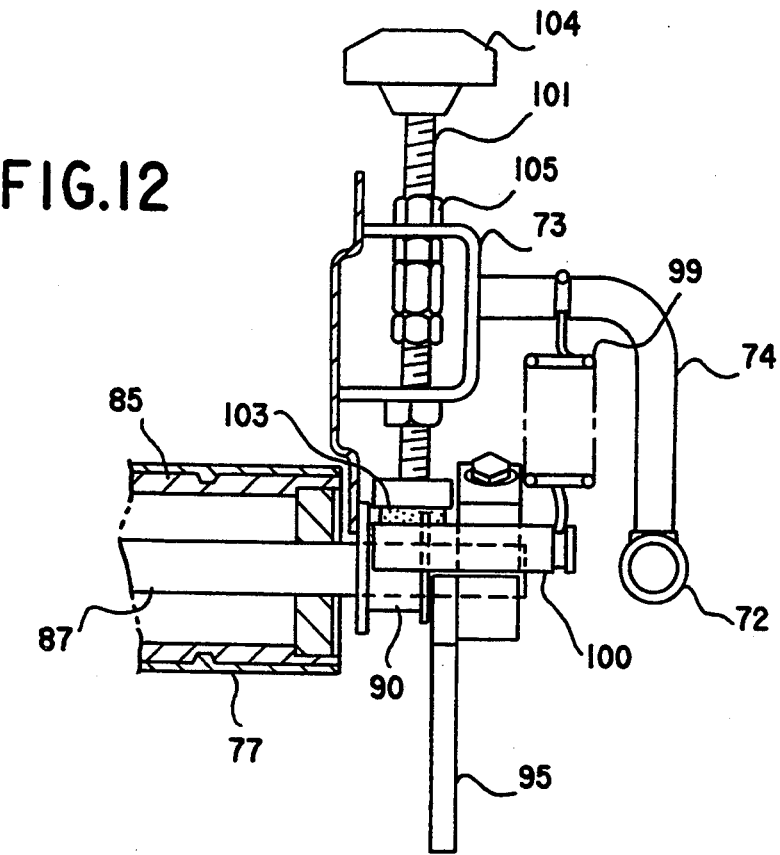
FIG. 12 is the partial diagram of the seedling forforwarding belt installation mechanism as per the arrowed line "H" shown in FIG. 9.

The main frame of the planting unit 5 comprises the following; a drive-force transmission gear housing 60 which receives drive force from the drive shaft 44 of the planting unit 5 via a drive-force transmission shaft 58; a pair of drive-force transmission pipes 61 and 61 which are projectively installed to both lateral surfaces of the drive-force transmission gear housing 60; and a case 62 which supports three planting levers extended from the rear surface of the drive-force transmission gear housing 60 and the both ends of the drive-force transmission pipes 61 and 61. A seedling mounting table 64, five units of planting devices 65, five units of soil reconditioning wheels 66, and an auxiliary seedling replenishing table 67, are respectively installed to the main frame of the planting unit 5. The seedling mounting table 64 is secured by way of slightly tilting itself so that the front end remains higher than the main frame of the planting unit 5. The rear end of the seedling mounting table 64 is supported by a frame 68 which is solely available for supporting the seedling mounting table 64 by way of permitting the rear end of the table 64 to freely slide itself to the left and to the right. The front end of the seedling mounting table 64 is held by a roller 70 which is provided for another frame 69 soley available for supporting the seedling mounting table 64. The reference numeral 72 designates a u-shaped frame (seen from the top) which protects lateral surfaces of the seedling mounting table 64, and yet, it serves as a handle to lift the planting unit 5. The rear end of the frame 72 is secured to the frame 68 and supported by a pair of supporting pipes 74 and 74 which vertically extend from a pair of brackets 73 and 73 integrated with the lateral plates of the seedling mounting table as shown in FIG. 12. A rail member 75 available for engagement with the roller 70 is secured to the frame 72. The upper surface of the seedling mounting table 64 is sectioned to provide a plurality of seedling mounting partitions 64a corresponding to the number of seedbed lines predetermined for transplanting vegetal seedlings. A seedling forwarding belt 77 is secured to the seedling mounting table 64. A receiver plate 80 integrated with the frame 68 available for supporting the seedling mounting table 64 is provided with a plurality of seedling outlets 79 corresponding to the number of the planting devices 65, where the receiver plate 80 is installed behind the seedling mounting table 64. A pot holder 81 is secured to the rear end of the seedling mounting table 64 in order to hold pot domain of those vegetal seedlings on the final rank of the receiver plate 80.

The drive-force transmission housing 60 stores a roll cam shaft 82 having spiral groove on its external circumference and a horizontaly shifting rod 83 which integrally moves with a metal having a claw engaged with the spiral groove. Tip ends of projections on both sides of the horizontally shifting rod 83 are respectively secured to the seedling-mounting-table frame 72. When the roller cam shaft 82 rotates in the predetermined direction, the horizontally shifting rod 83 horizontally moves itself to cause the seedling mounting table 64 to reciprocate itself to the left and to the right.

Figure 13:
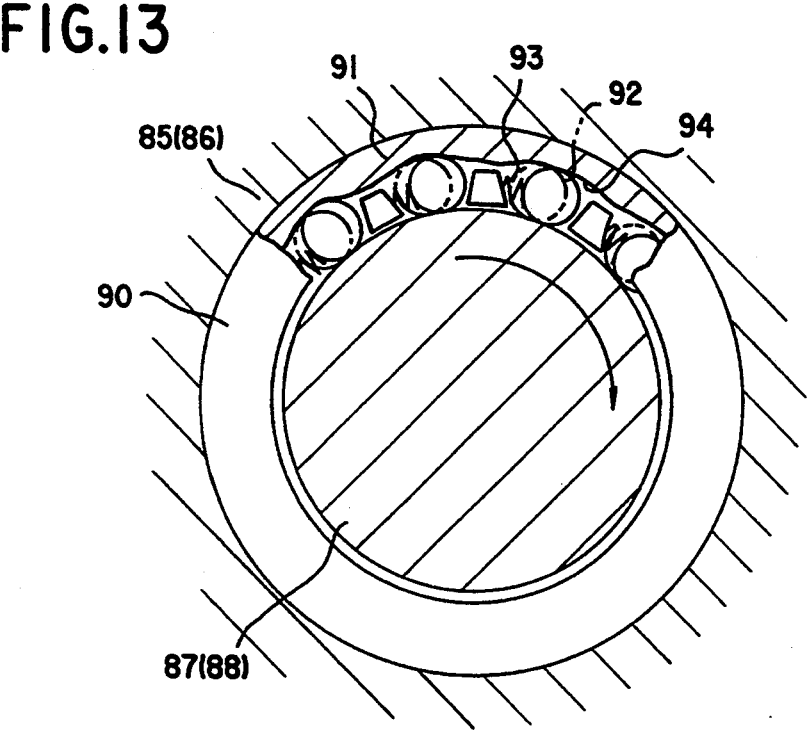
FIG. 13 is the sectional view of part of a part of the one-way clutch.
Figure 14:
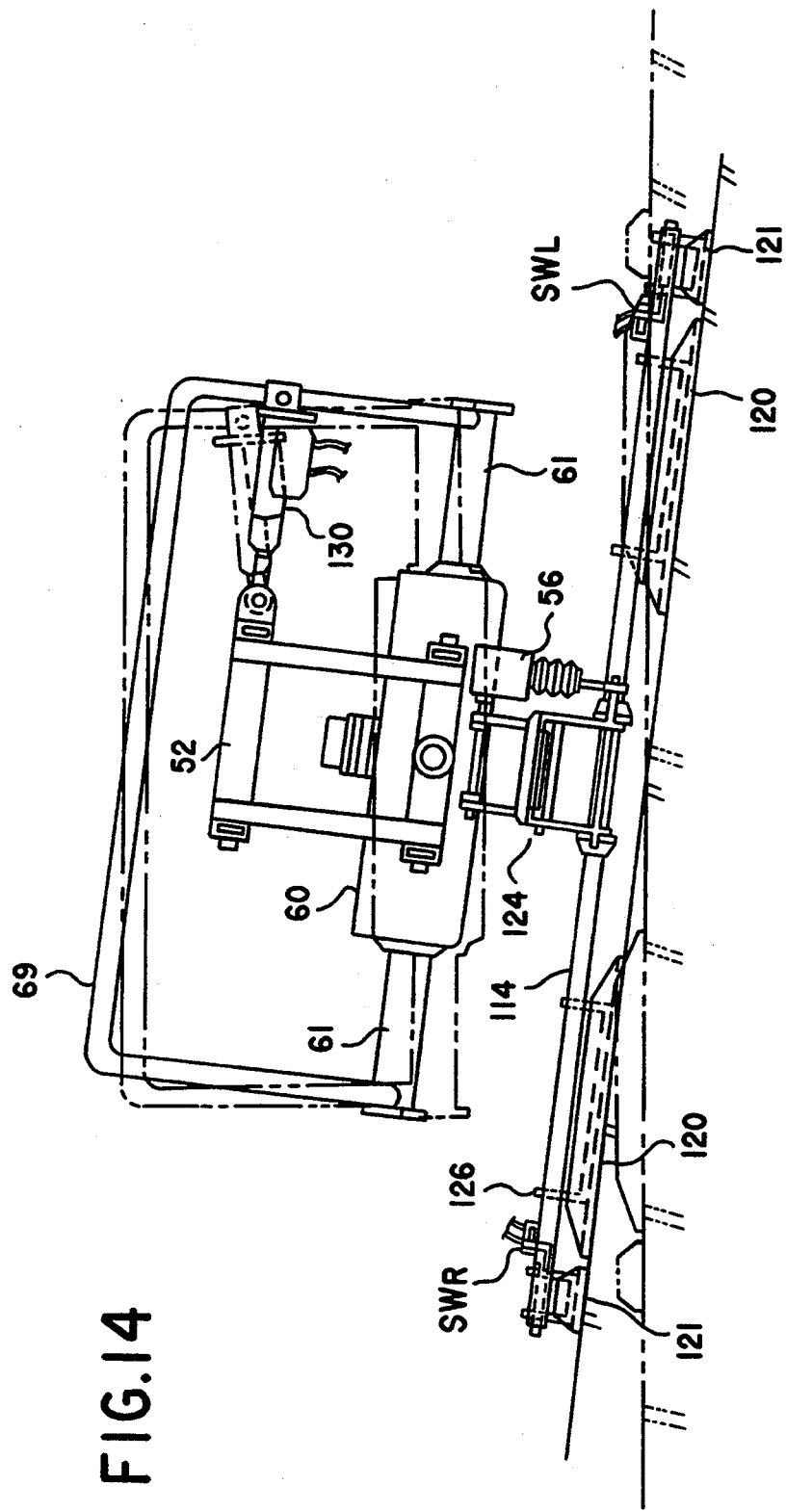
FIG. 14 is the front view of the bottom of the planting unit of the vehicular machine embodied by the invention.
Figure 15:
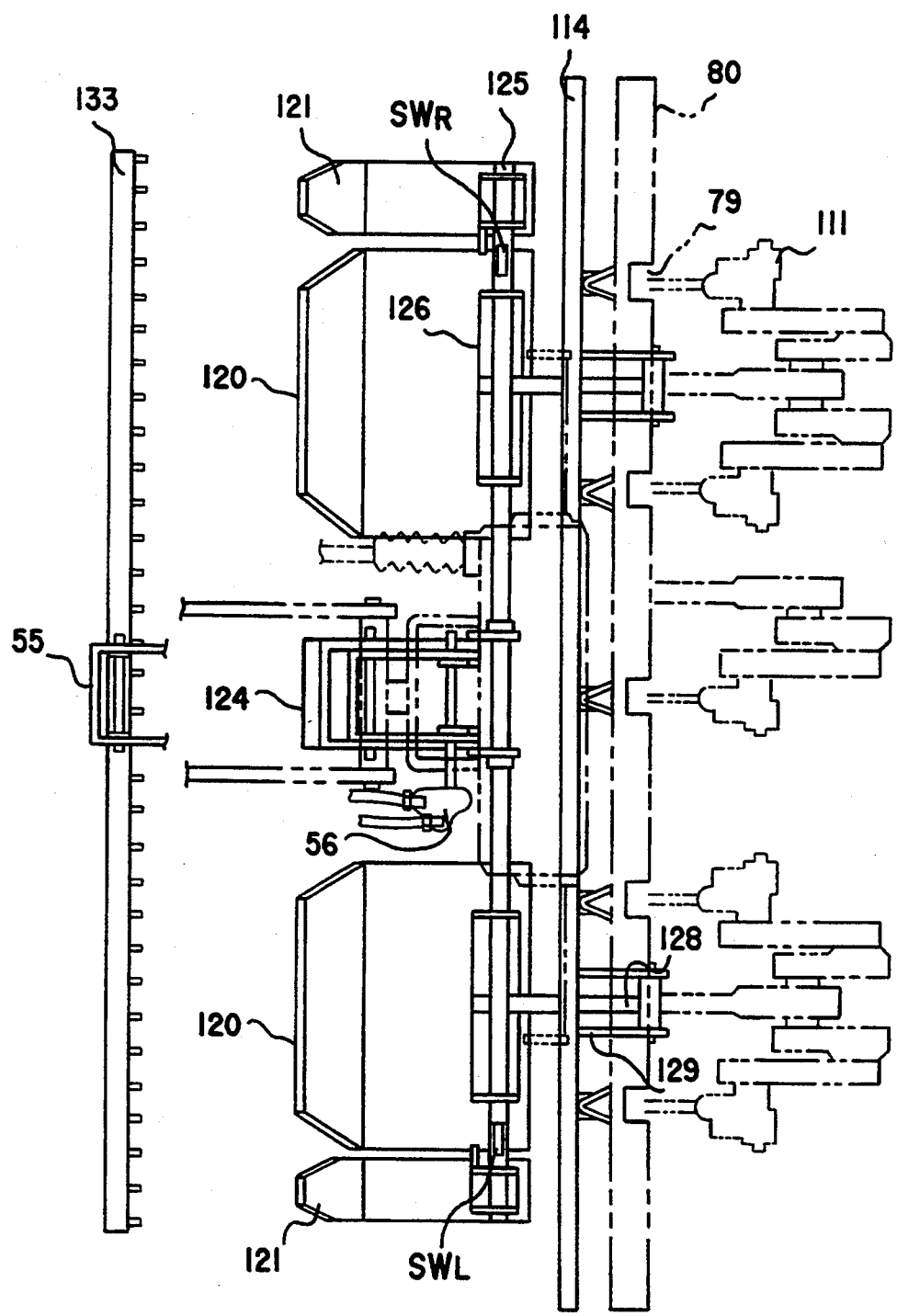
FIG. 15 is the plan of the bottom of the planting unit of the vehicular machine embodied by the invention.

FIG. 9 through FIG. 12 respectively designate the mechanism for installing the above-identified seedling mounting belt 77. The seedling mounting belt 77 is engaged with a pair of seedling forwarding rollers including a drive roller 85 and a follower roller 86. A plurality of drive rollers 85 corresponding to the number of the seedbed lines are secured to a drive-roller shaft 87 via a one-way clutch 90. Likewise, a plurality of follower rollers 86 corresponding to the number of the seedbed lines are secured to a follower-roller shaft 88 via the one-way clutch 90. As shown in FIG. 13, the round housing 91 of the one-way clutch 90 is annularly provided with a number of rollers 92 and a number of springs 93 which respectively energize these rollers 92 in the predetermined direction in this housing 91. The inner circumferential surface of the housing 91 is provided with a number of wedge-like recesses 94 engageable with these rollers 92. When the drive roller shaft 87 and the follower roller shaft 88 respectively rotate in the arrowed direction, as shown with solid lines, these rollers 92 are respectively engaged with the wedge-like recesses 94 to receive rotating force. Conversely, when the drive roller shaft 87 and the follower roller shaft 88 respectively reverse the rotation, as shown with broken lines, these rollers 92 are respectively disengaged from the wedge-like recesses 94, and thus, no rotating force is transmitted to these rollers 92. While solely rotating these rollers 92, rotating force is transmitted to the shaft in the direction inverse from the direction of driving the shaft.

When operating the drive mechanism embodied by the invention, rotating force is merely transmitted in the direction I (concretely, in the direction of forwarding those vegetal seedlings) from the drive roller shaft 87 to the drive roller 85. When transmitting rotating force from the follower roller shaft 88 to the follower roller 86, the rotating force is merely transmitted in the direction J (concretely, in the direction of forwarding those vegetal seedlings). While transmitting rotating force from the drive roller 85 to the drive roller shaft 87, the rotating force is merely transmitted in the direction which is inverse from the direction I. Conversely, while transmitting rotating force from the follower roller 86 to the follower roller shaft 88, the rotating force is merely transmitted in the direction which is inverse from the direction J.

Next, details of the seedling forwarding mechanism and the seedling-forwarding adjustment mechanism are respectively described below. Concretely, the seedling forwarding mechanism comprises those components including the following; a seedling forwarding arm 95 which is unrotatably secured to the both edges of the drive roller shaft 87; and a seedling forwarding drive arm 97 which is secured to the both edges of the roll cam shaft 82 in order to support a roller at its tip end. As soon as the seedling mounting table 64 arrives at an end of reciprocating route either to the left or to the right, the roller 96 comes into engagement with the seedling forwarding arm 95 to rotate the drive roller shaft 87 in the direction I by a predetermined amount. As a result, the seedling forwarding belt 77 moves itself in the seedling forwarding direction by a specific amount corresponding to a piece of vegetal seedling. The reference numeral 99 shown in FIG. 12 designates a spring available for returning the seedling forwarding arm 95. The spring 99 is installed between the supporting pipe 74 and an end of a pin 100 which is horizontally secured to the base of the seedling forwarding arm 95. The reference numeral 101 shown in FIG. 12 designates a seedling forwarding adjustment screw which is coupled with a nut 102 secured to the bracket 73. The tip end of the screw 101 remains in contact with the pin 100 via a cushion member 103. When the machine operator moves the seeding forwarding adjustment screw 101 back and forth by operating a grip 104 to vary the setup angle of the seedling forwarding arm 97, he can properly adjust the amount of vegetal seedlings which are supposed to be fed per operation. If no adjustment were needed, then the operator secures the adjusting screw 101 with a locking nut 105.

Concretely, the seedling forwarding adjustment mechanism comprises those components including the following: In order to carry forward vegetal seedlings, an operating rod 108 is secured to an arm member 107a of a rib 107 which is coupled with the one-way clutch 90 of the follower roller 86 available for forwarding vegetal seedlings. As soon as the machine operator pulls the operating rod 108, the rib 107 and the follower roller 86 jointly rotates themselves in the direction J. As mentioned earlier, since no rotating force is transmitted from the follower roller 86 to the follower roller shaft 88, and likewise, no rotating force is transmitted from the drive roller 85 to the drive roller shaft 87, only the seedling forwarding belt 77 corresponding to the objective seedbed line shifts itself in the seedling forwarding direction. The seedling forwarding operating rod 108 is held by the rail member 75 and energized in the return direction by the spring 109.

Figure 18:
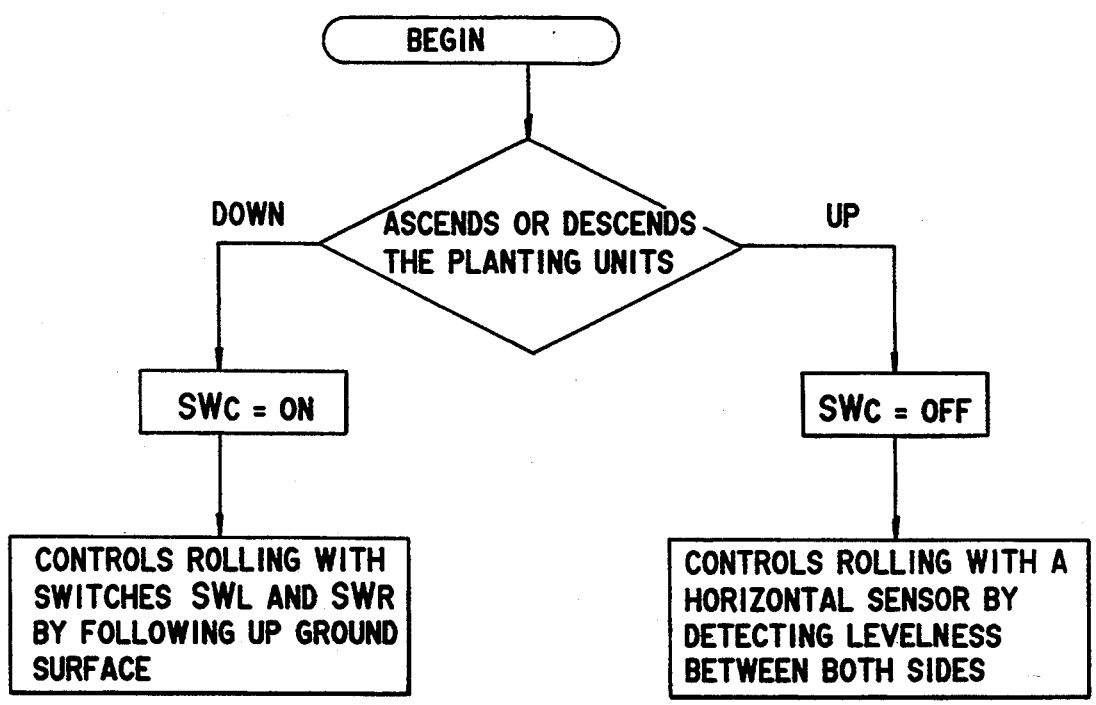
FIG. 18 is the flowchart of operation for controlling rolling of the planting unit embodied by the invention.

The vegetal seedling transplanting device 65 is furnished with a plurality of planting levers 111 which respectively move in the vertical direction along the predetermined track. Each of these planting levers 111 grasps vegetal seedlings delivered to the outlet 79 at the top of the track, and then releases the seedlings at the bottom of the track onto designated groove dug by a groove excavator 112. The groove excavator 112 is secured to a horizontal rod 114 held by a bracket 113 secured to the base of the planting-lever supporting case 62. When the machine operator stops the seedling planting operation, as shown in FIG. 1 and FIG. 18, a stationary-position clutch (not shown) stops the movement of the planting levers 111 at the top of the rotating track. As a result, when the whole mechanism of the planting unit 5 completely stops operation, all the planting levers 111 are positioned right above the vegetal seedlings stored on the seedling mounting table 64 and the pot holder 74, thus permitting the machine operator mounted on the working step 25 to fully observe the state of the planting levers 111.

Figure 2:
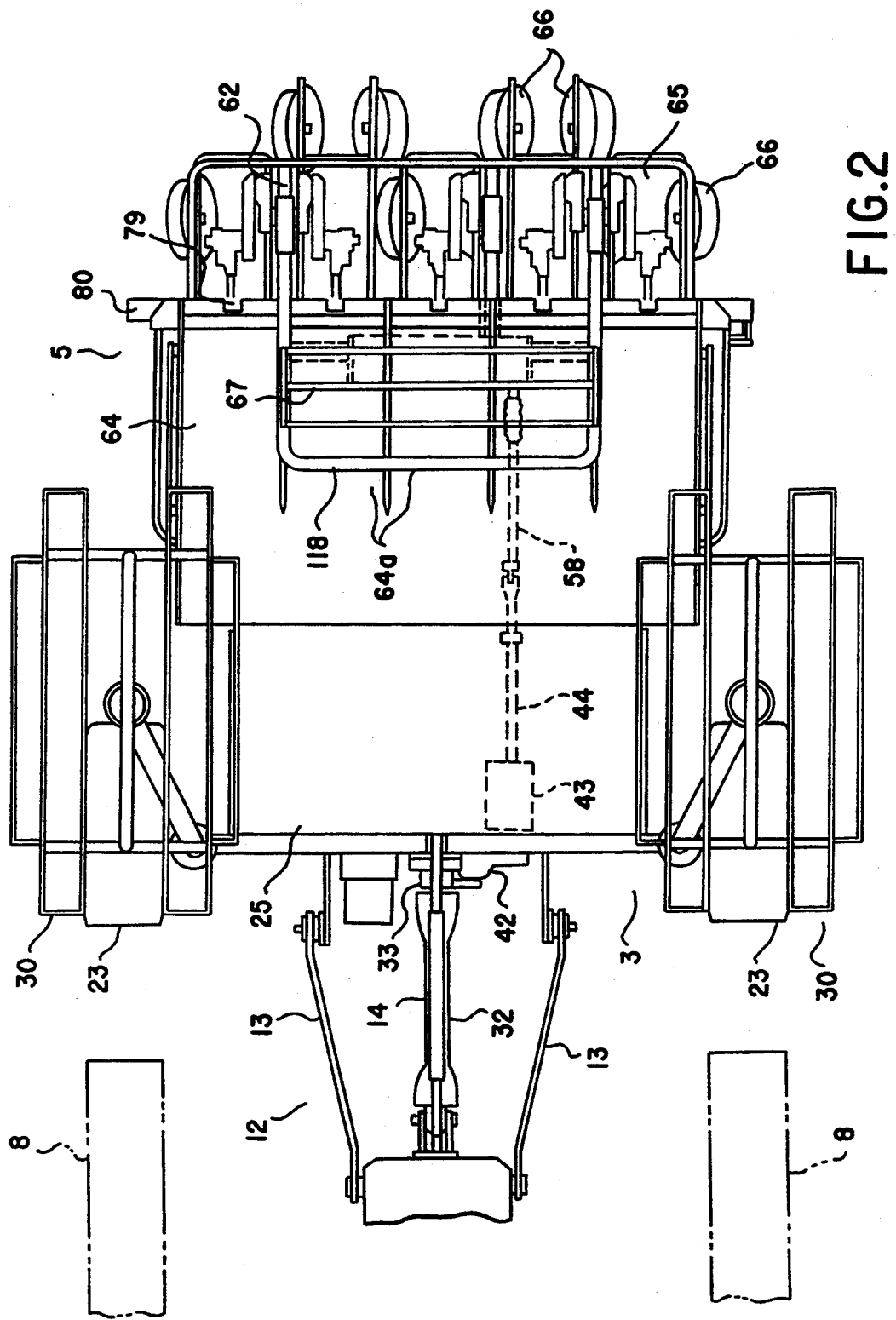
FIG. 2 is the plan of essential components of the vehicular machine embodied by the invention shown in FIG. 1.

A pair of wheels 66 and 66 available for reconditioning soil of plowed seedbed lines respectively being disposed on both horizontal sides across those plowed seedbed lines make up a unit. Typically, multi-pairs of wheels 66 are provided for the planting unit 5 as shown in FIG. 2.

In order to prevent these wheels 66 on respective seedbed lines from interfering with each other, those wheels 66 on the odd-th lines and the even-th lines are respectively disposed by way of shifting them in the forward and backward directions. Each pair of these wheels 66 are obliquely held so that the distance between each pair of wheels 66 is incremental in the upper direction, and yet, these wheels 66 and 66 are respectively energized in the downward direction by a spring 116. Functionally, these wheels 66 respectively pick up soil in the inward direction to reclaim grooves furnished with planted vegetal seedlings before smoothly reconditioning soil in the periphery of the planted vegetal seedlings.

The auxiliary seedling supply table 67 provisionally mounts those seedling containers drawn out of the reserved seedling mounting tables 30 on the way of replenishing vegetal seedlings. The auxiliary seedling supply table 67 is disposed on a frame 118 erected on those planting-lever supporting cases 62 and 62. The auxiliary seedling supply table 67 is set to low position corresponding to the waist of the machine operator. Furthermore, the operator can easily gain access to this table 7. On the other hand, the frame 118 supporting the auxiliary seedling supply table 67 also serves as a handrail for the operator on the working step 25. As shown in FIG. 1, it is desired that the auxiliary seedling supply table 67 be provided so that the sight of the planting levers 111 at the halt position cannot be intercepted even when the operator stands on the working step 25.

Figure 16:
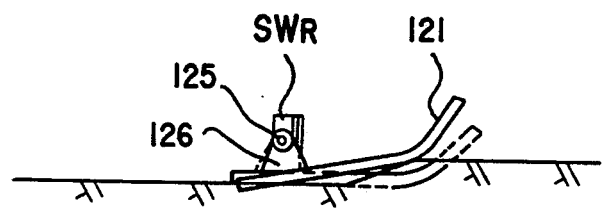
FIG. 16 is the lateral view of the rolling sensor.

As shown in FIG. 14 through FIG. 17, a pair of obliquely disposed pitching sensors 120 and 120 and another pair of rolling sensors 121 and 121 disposed on the identical oblique line are respectively provided below the planting unit 5. As shown in these drawings, these pitching sensors 120 and 120 are respectively set to positions capable of detecting a pair of external planting lines. Those rolling sensors 121 and 121 are respectively disposed outside of those pitching sensors 120 and 120. These pitching and rolling sensors 120 and 121 are respectively secured to a sensor fixing rod 125 held on the drive-force transmission housing 60 by means of an expandable and contractible linking member 124 by applying corresponding sensor fixing members 126. These sensors 120 and 121 can respectively ascend and descend their height positions against the working truck 3 in correspondence with the projected and recessed conditions on the surface of the seedbed field. Since the rear end of a pipe extended from the pitching sensor 120 in the backward direction and a horizontally extended rod 114 are connected to each other by means of a connective linking member 129, these pitching sensors 120 can respectively move themselves in conjunction with the sensor fixing rod 125. On the other hand, as shown in FIG. 16, those rolling sensors 121 are respectively secured to the sensor fixing rod 125 so that they can freely rotate themselves in the vertical direction.

The main body of the oil-pressurized valve 56 is secured to the expandable and contractible linking member 124 on the part of the drive-force transmission housing 60, and yet, a spool is connected to the expandable and contractible linking member 124 on the part of sensors. Functionally, the oil-pressurized valve 56 detects the vertical movement of those pitching sensors 120, and then, in response to the vertical movement of those pitching sensors 120, the oil-pressurized valve 56 properly controls the oil-pressurized cylinder 54. For example, when these pitching sensors 120 and 120 respectively ascend themselves in correspondence with the rise of the round surface of the seedbed field, the oil-pressurized valve 56 is driven in the direction of permitting the oil-pressurized cylinder 54 to elongate itself. Conversely, when these pitching sensors 120 respectively descend themselves in correspondence with the fall of the ground surface of the seedbed field, the oil-pressurized valve 56 is driven in the direction of permitting the oil-pressurized cylinder 54 to contract itself. In this way, the oil-pressurized valve 56 properly controls pitching effect of the planting unit 5 by permitting it to properly ascend and descend its height position in correspondence with the ground level condition of the seedbed field so that the planted depth of all the vegetal seedlings can securely be maintained constant.

In order to properly control rolling effect, in other words, in order to properly control the swinging of the planting unit 5 to the left and to the right, an electrically driven rolling cylinder 130 is horizontally installed between the connecting frame 52 of the parallel linking device 4 and the frame 69 which supports the seedling mounting table 64. Since the operating amount of the rolling cylinder 130 is by no means sufficient, and yet, since quickly responsive operation is required, it is desired that the rolling cylinder 130 be driven by means of electric power.

There are two modes practically available for controlling rolling effect including "operative" mode and "inoperative" mode. These modes can automatically be switched from each other by operating a change-over switch SWc which is provided in the neighborhood of the upper link member 50 of the rear frame 22. Concretely, when the "operative" mode is entered, a lever of the change-over switch SWc is depressed by the upper link member 50 rotating in the downward direction to activate "ground-surface followup control" mode. On the other hand, when the "inoperative" mode is entered, the lever of the change-over switch SWc returns to the initial position to activate "absolute horizontal control" mode.

Figure 17:
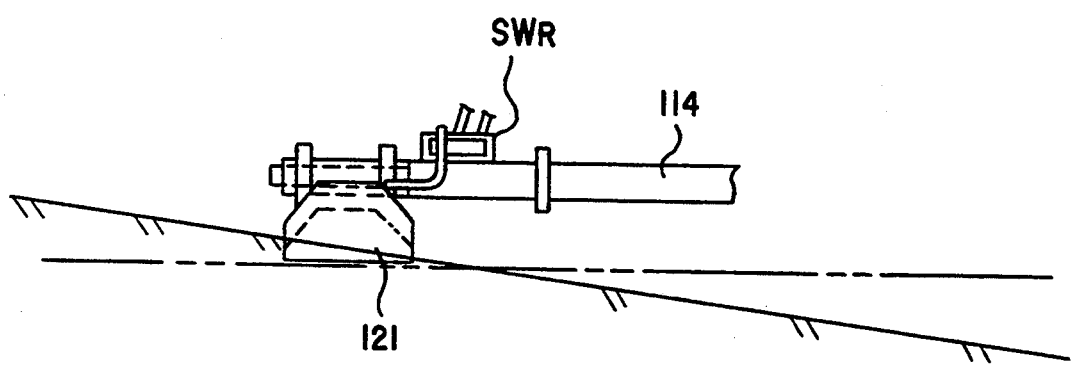
FIG. 17 is the front view of the roller sensor.

The "ground surface followup control" mode is described below. Those rolling sensors 121 and 121 secured to the left and to the right of the sensor fixing rod 125 are respectively provided with a ground-pressure sensing switch SWL and a ground-pressure sensing switch SWR which are respectively activated as soon as pressure from the ground surface of the seedbed field exceeds a predetermined value. In response to the ground pressure detected by those ground-pressure sensing switches SWL and SWR, the rolling cylinder 130 either elongates or contracts itself. For example, as shown in FIG. 17, if the ground surface inclines in the upper-rightward direction, then, the ground-pressure sensing switch SWR turns itself ON to cause the rolling cylinder 130 to contract itself, and then, the planting unit 5 is also obliquely positioned so that the right end of the planting unit 5 can rise to the right. In this way, while the vegetal seedling planting operation is underway, these ground-pressure sensing switches SWL and SWR properly control the posture of the planting unit 5 in order that it can constantly be positioned in parallel with the ground surface of seedbed filed. In consequence, depth of the planted seedlings can securely be held constant in all the seedbed field lines.

Next, the "absolute horizontal control" mode is described below. A horizontal sensor 131 is provided on the drive-force transmission housing 60 in order to detect the levelness. A pair of those rolling cylinders 130 and 130 are properly controlled in reference to the levelness detected by the horizontal sensor 131 so that the moving planting unit 5 always be positioned at perfect levelness in the course of planting those vegetal seedlings on the seedbed lines.

Not only performing those functions proper to those pitching sensors 120 and rolling sensors 121, but all of these sensors 120 and 121 also properly condition soil before actually planting vegetal seedlings on the seedbed lines. Soil pressed by these sensors 120 and 121 rises on both sides of these sensors 120 and 121. To prevent these sensors 120 and 121 from adversely being affected by swollen soil, it is desired that sufficient intervals be provided between the rear ends of these sensors 120 and 121 and the groove excavator 112.

A rake 133 is installed to the tip end of the pitching arm 55. The rake 133 has width corresponding to the intervals between the external edges of those rolling sensors 121 and 121 provided on both sides of the sensor fixing rold 125. As shown in FIG. 8 with solid line, while the seedling planting operation is underway, the rake 133 remains in contact with the ground surface. However, as shown in FIG. 8 with chained line, while no planting operation is underway, the rake 133 retracts itself in the backward direction aloft from the ground surface. In this way, the rake 133 is installed in front of those pitching sensors 120 and rolling sensors 121 which concurrently function to condition the ground surface before the plant unit 5 actually starts to plant seedlings on the seedbed lines. This mechanism helps to properly condition the ground surface, prevents those sensors from malfunctioning themselves, and yet, securely promotes accuracy of controlling the pitching and rolling of the planting unit 5.

Figure 19:
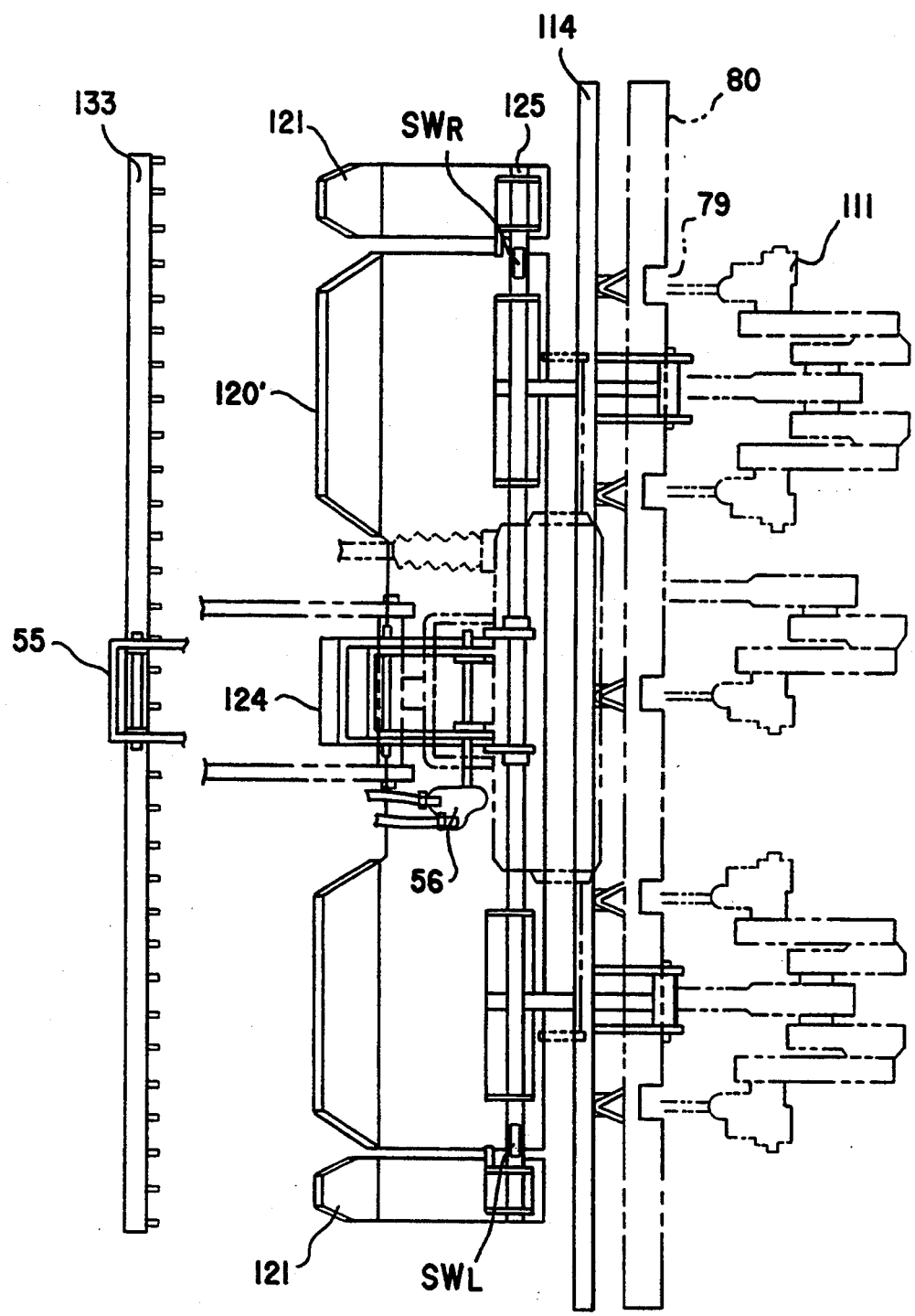
FIG. 19 is the plan of the pitching control system provided with pitching sensors having different shapes according to another embodiment of the invention.

Alternatively, as shown in FIG. 19, those pitching sensors 120 and 120 on both sides of the sensor fixing rod 125 may integrally be combined with each other so that all the seedbed lines can jointly be conditioned.

Before actually starting off the vegetal seedling planting operation, the operator mounts vegetal seedlings on respective seedling mounting sections 64a of the seedling mounting table 64. The operator also mounts those vegetal seedlings stored in containers onto a plurality of shevles 29 provided for the reserved seedling mounting table 32. Next, in order to replenish vegetal seedlings, the operator mounts himself on the working step 25, and then starts off the tractive vehicle while transmitting drive force to the planting unit 5. The operator then moves the reserved seedling mounting table 30 in the forward direction in order to reserve space enough to facilitate himself when mounting on and dismounting himself from the working step 25. On the way of planting vegetal seedings on the predetermined seedbed lines, if the remaining amount of seedlings runs short, operator then replenishes vegetal seedlings from those reserved seedling mounting tables 32 to those seedling mounting sections 64a as required. Since the working step 25 is set to a low position, the operator can conveniently command the view of the seedling mounting table 64. Furthermore, since the auxiliary seedling supply table 67 is provided in front of the working step 25, operator can easily replenish seedlings.

The working-truck supporting wheels 23 and 23 respectively follow tracks trodden by the rear wheels 8 and 8 of the tractive vehicle 2, and as a result, the working truck 25 is free from incurring much vibration in the vertical direction. This in turn facilitates the operator on the working step 25 to easily replenish vegetal seedlings, and yet, the pitching and rolling movement of the planting system can fully be suppressed relative to the movement of the working truck 25 which merely incurs minimum vibration in the vertical direction.

FIG. 20 through FIG. 27 respectively designate a vehicular machine for transplanting vegetal seedlings on multiple seedbed lines according to another embodiment of the invention. The vehicular machine available for transplanting vegetal seedlings on multiple seedbed lines related to this embodiment is furnished with four of the independent planting units 205 against a working truck 203 which is hauled by a tractive vehicle 2. A drive-force input housing 220 is provided on the back of a connective frame 210, where the drive-force input housing 220 receives rotating force from the PTO shaft 10 of the tractive vehicle 2 via a universal joint 219. A truck frame is formed by connecting a pair of top-frame pipes 221L and 221R projecting themselves from the drive-force input housing 220 to the left and to the right to a pair of bottom-frame pipes 223 and 224 (which are horizontally disposed behind and below those top-frame pipes 221 to the left and to the right) by means of a pair of connective plates 226 and 226 and a pair of lateral plates 227 and 227. When viewing from the back, the connective frame 210 looks like a mountain. The bottom of this connective frame 210 is secured to a pair of fixing flanges 229 and 229 which are provided on both sides of the drive-force input housing 220. A jack 230 set to the center of the connective frame 210 is connected to the top of the drive-force input housing 220.

A working step 232 is provided on the truck frame. The working step 232 is furnished with a backwardly extended member 232a at a position slightly closer to the right from the intermediate domain on the top of the truck frame. A seat 233 is set to the center of the working step 232 in the backward direction to accommodate an operator who replenishes vegetal seedlings. A rod 237 available for supporting those soil-reconditioning wheels 238 is horizontally installed below a pair of the-top frame pipes 221 and 221. A number of rubber-tire wheels 238 are jointly supported by the rod 237 to fully support the working truck 203 and recondition soil of seedbed field lines. The reference numeral 241 shown in FIG. 20 through FIG. 27 designates teeth which respectively dig soil trodden by those rear wheels 8 and 8 before softening and bulking it. The reference numeral 243 designates marker which marks seedbed lines to facilitate the following planting operations.

Four of those planting units 205 are respectively of identical structure. Each of these planting units 205 is furnished with those essential components including the following; a seedling mounting table 250, a groove-excavator 251 which digs grooves on the seedbed field for planting vegetal seedlings, a planting device 252 which plants vegetal seedlings on the seedbed field lines, and a pair of soil-recovering wheels 253 and 253 which are respectively aligned on both sides of those planting units 205 in order to properly recover soil to bury grooves after planting those vegetal seedings. Each of these planting units 205 is supported on the ground surface of seedbed field by a pair of supporting wheels 257 and 257 disposed on both sides.

Figure 25:
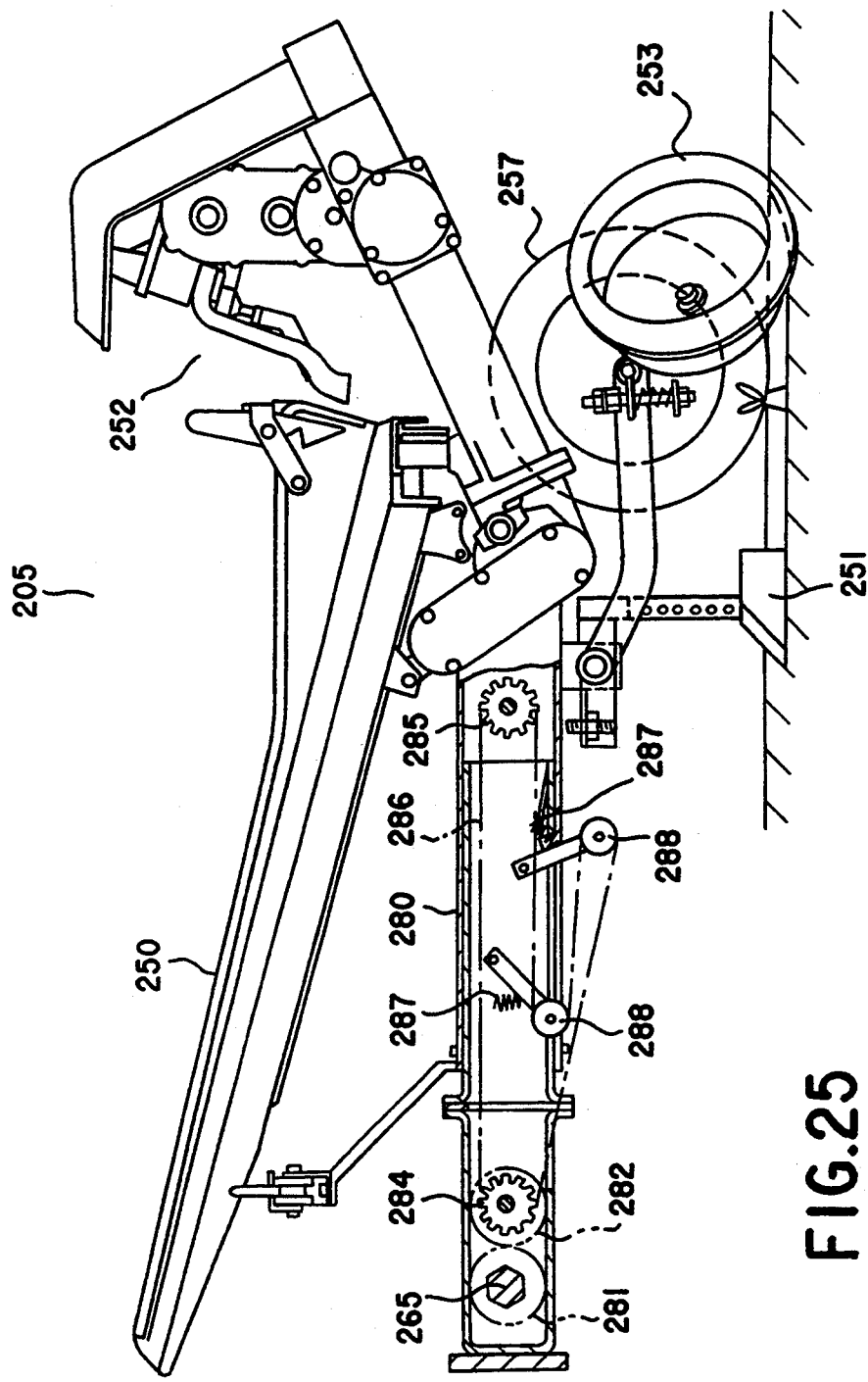
FIG. 25 is the lateral view of the planting unit of the vehicular machine embodied by the invention.
Figure 26:
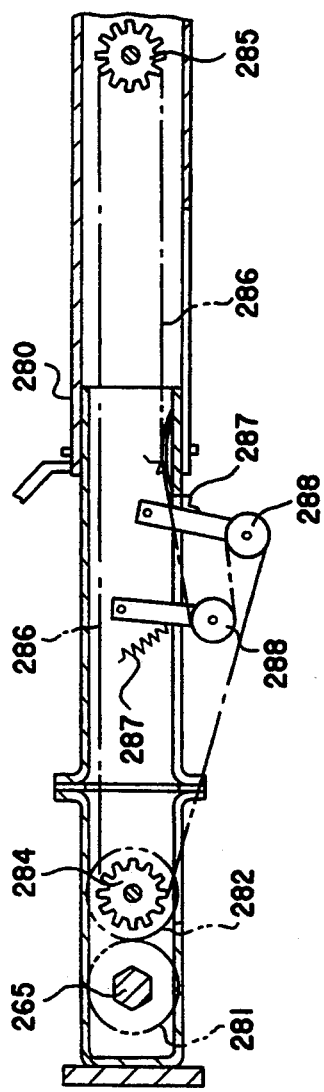
FIG. 26 is the plan of the planting unit of the vehicular machine embodied by the invention.
Figure 27:
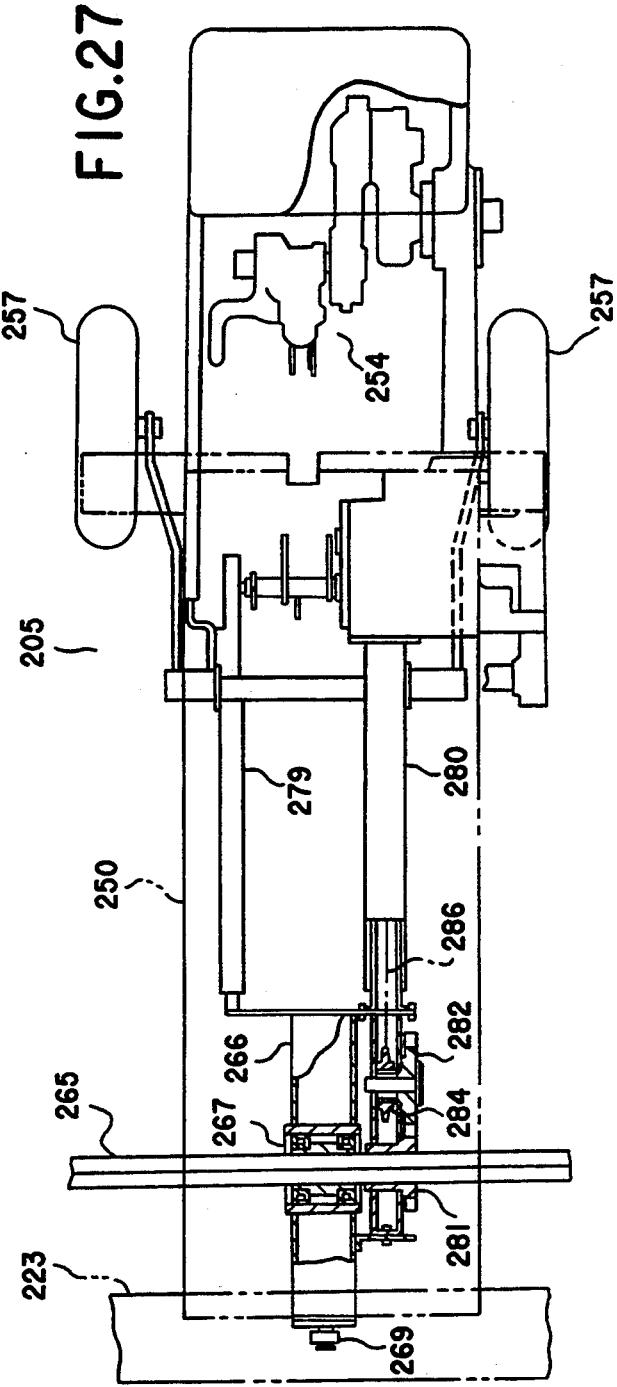
FIG. 27 designates those components which are different from those which are available for the planting unit shown in FIG. 26.

Concretely, each planting unit 205 is secured to a hexagonal shaft 265 which is held below the intermediate domain of the bottom frame pipes 233 and 234. As shown in FIG. 25 through FIG. 27, a bearing 267 of a fixing frame 266 on the part of the planting unit 205 is slidably coupled with the hexagonal shaft 265 to permit the whole planting units 205 to freely swing themselves in the vertical direction by pivoting on the hexagonal shaft 265. A roller 269 which is freely rotatable along the bottom surface of the bottom pipe frame 223 in the front and a roller 270 freely rotatable along the top surface of the other bottom pipe frame 223 in the back, are respectively installed to the frame of each planting unit 205 via shift play (S1+S2). Each of these planting units 205 is permitted to perform pitching movement in the vertical direction within the slight play range. An interline adjusting lever 272 is provided for the fixing frame 226 by way of projecting itself in the direction of the working step 232. The machine operator causes these planting units 205 to shift themselves along the hexagonal shaft 265 by operating the interline adjusting lever 272 to properly adjust intervals between seedbed field lines in the horizontal direction of the planting units 205. A plurality of lever energizing members 273a are provided for a guide groove 273 of the working step 232 at the predetermined positions. Since all the planting units 205 are supported by a roller 269 or the other roller 270, these planting units 205 can easily shift themselves to permit the operator to easily adjust intervals between seedbed field lines. Furthermore, in order to facilitate movement of these planting units 205 in the forward and backward directions, a frame 280 available for transmission of drive force and a side frame 279 are respectively provided for each of these planting units 205, where the frame 280 and the side frame 279 can freely elongate and contract themselves.

Practically, the above-identified hexagonal shaft 265 drives all the planting units 205 furnished for the vehicular machine related to this embodiment. The hexagonal shaft 265 is rotated by drive force transmitted from the drive-force input housing 220 via a rotary shaft 221a stored in the top frame pipe 221L, via a pair of gears 242a and 242b stored in a gear case 242, via a rotary shaft 276, and finally via a chain 277a stored in a chain case 277. A gear 281 secured to the drive-force transmission frame 280 of each planting unit 205 is slidably coupled with the hexagonal shaft 265. Another gear 282 engaged with the gear 281 is rotatably secured to the drive-force transmission frame 280. A chain 286 is engaged with a sprocket 285 stored in a frame on the part of a transmission gear case 257. As mentioned earlier, since the drive-force transmission frame 280 freely elongates and contracts itself, a pair of tension rollers 288 and 288 are respectively installed by way of being energized by a pair of springs 287 and 287 in the direction of transmitting tension to the chain 286. As shown in FIG. 25, even when contracting the drive-force transmission frame 280, or as shown in FIG. 26, even when elongating the drive-force transmission frame 280, tension of the chain 286 is maintained constant.

Figure 20:
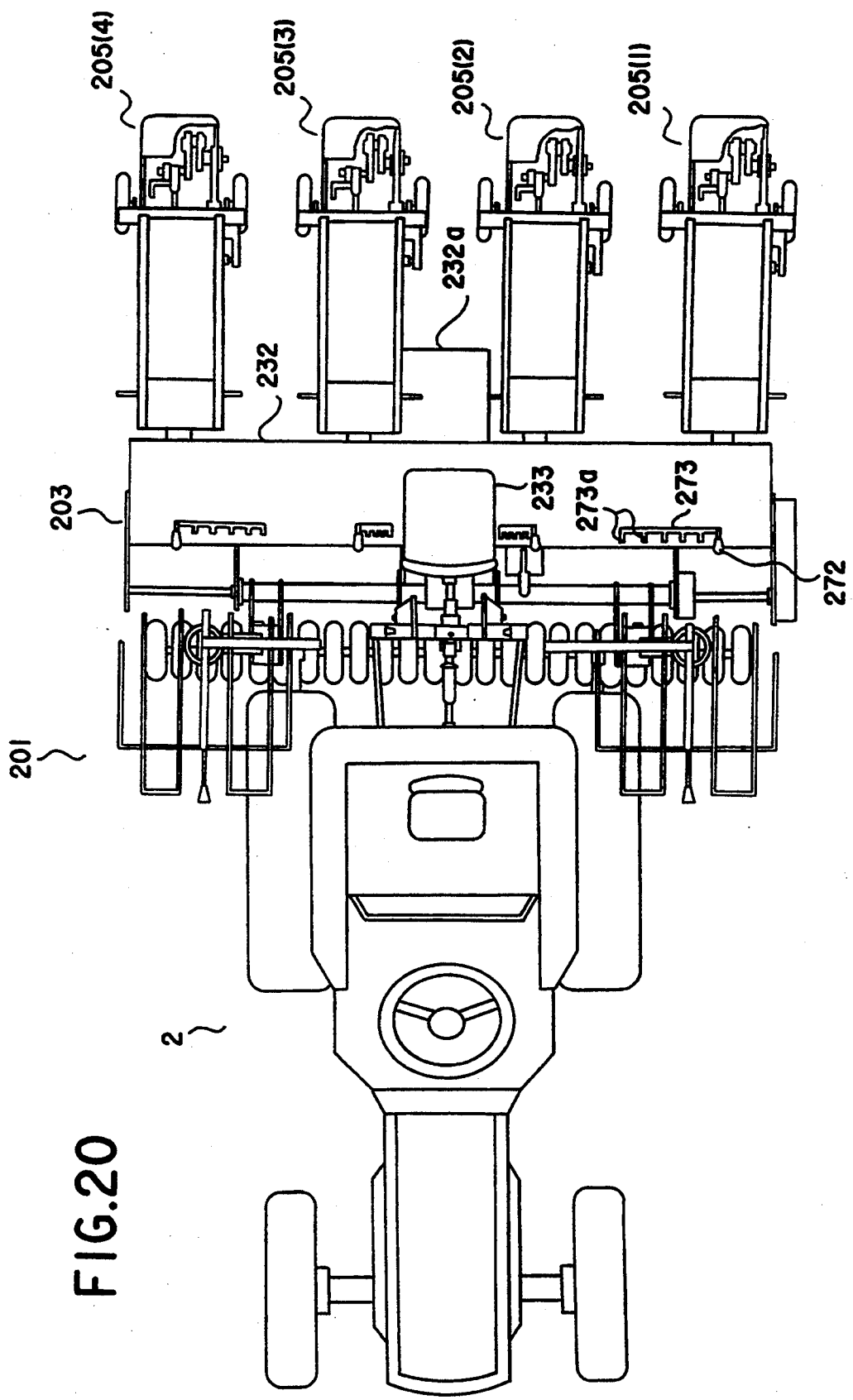
FIG. 20 is the plan of the vehicular machine furnished with a plurality of planting units independently provided for respective seedbed lines according to another embodiment of the invention.
Figure 21:
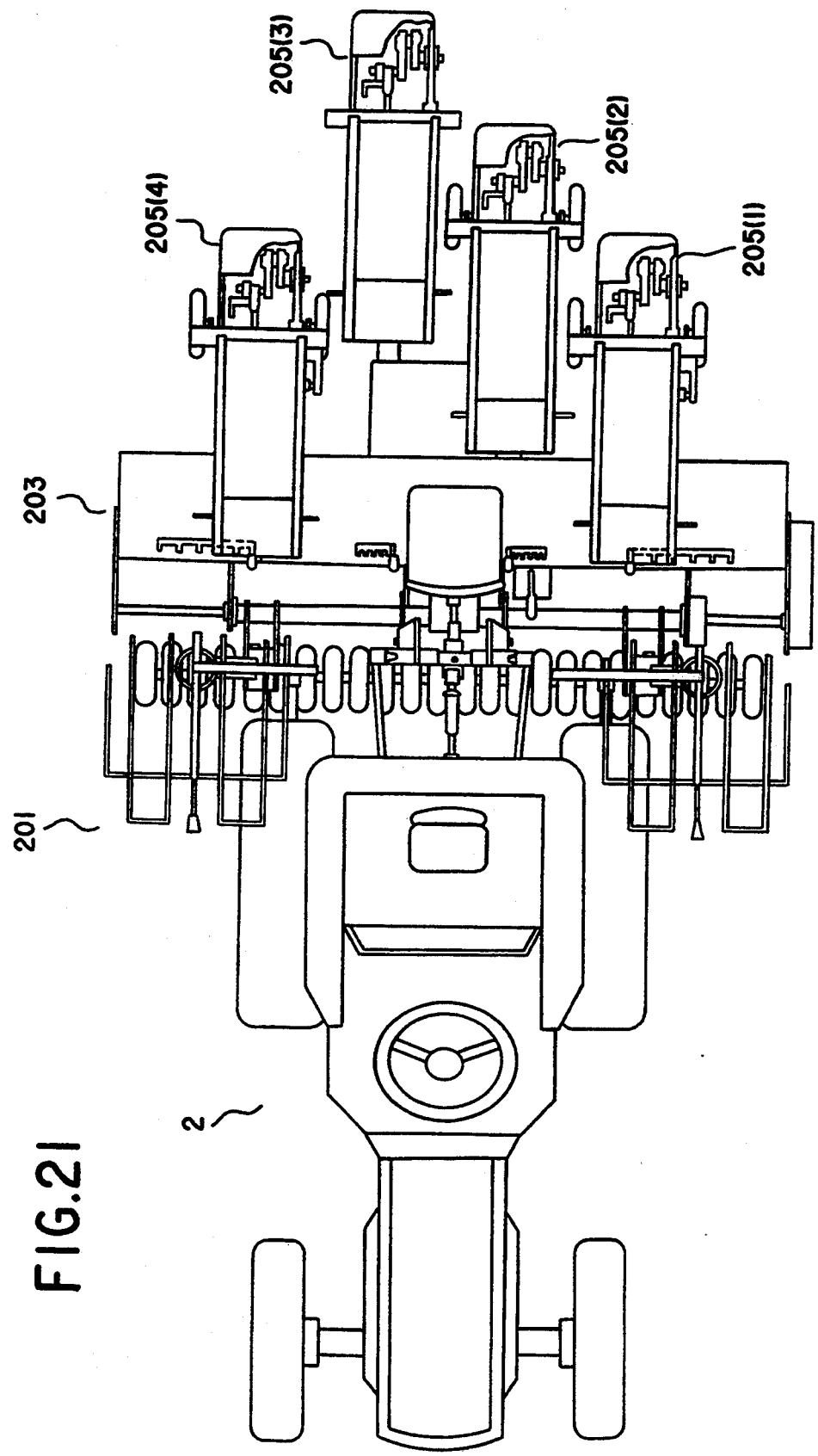
FIG. 21 is the plan of the vehicular machine according to another embodiment of the invention having an aspect different from that shown in FIG. 20.
Figure 22:
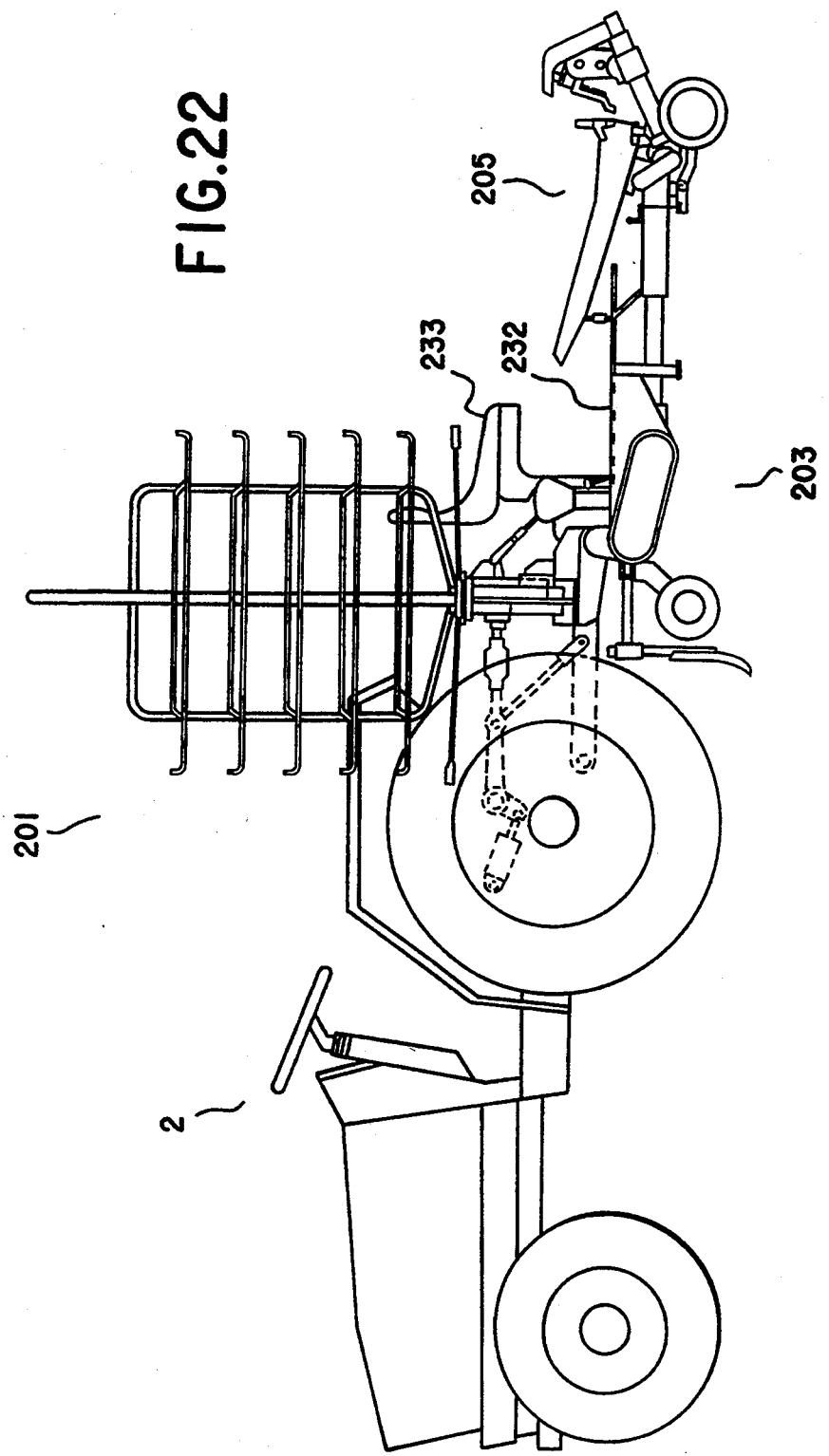
FIG. 22 is the lateral view of the vehicular machine shown in FIG. 20.
Figure 23:
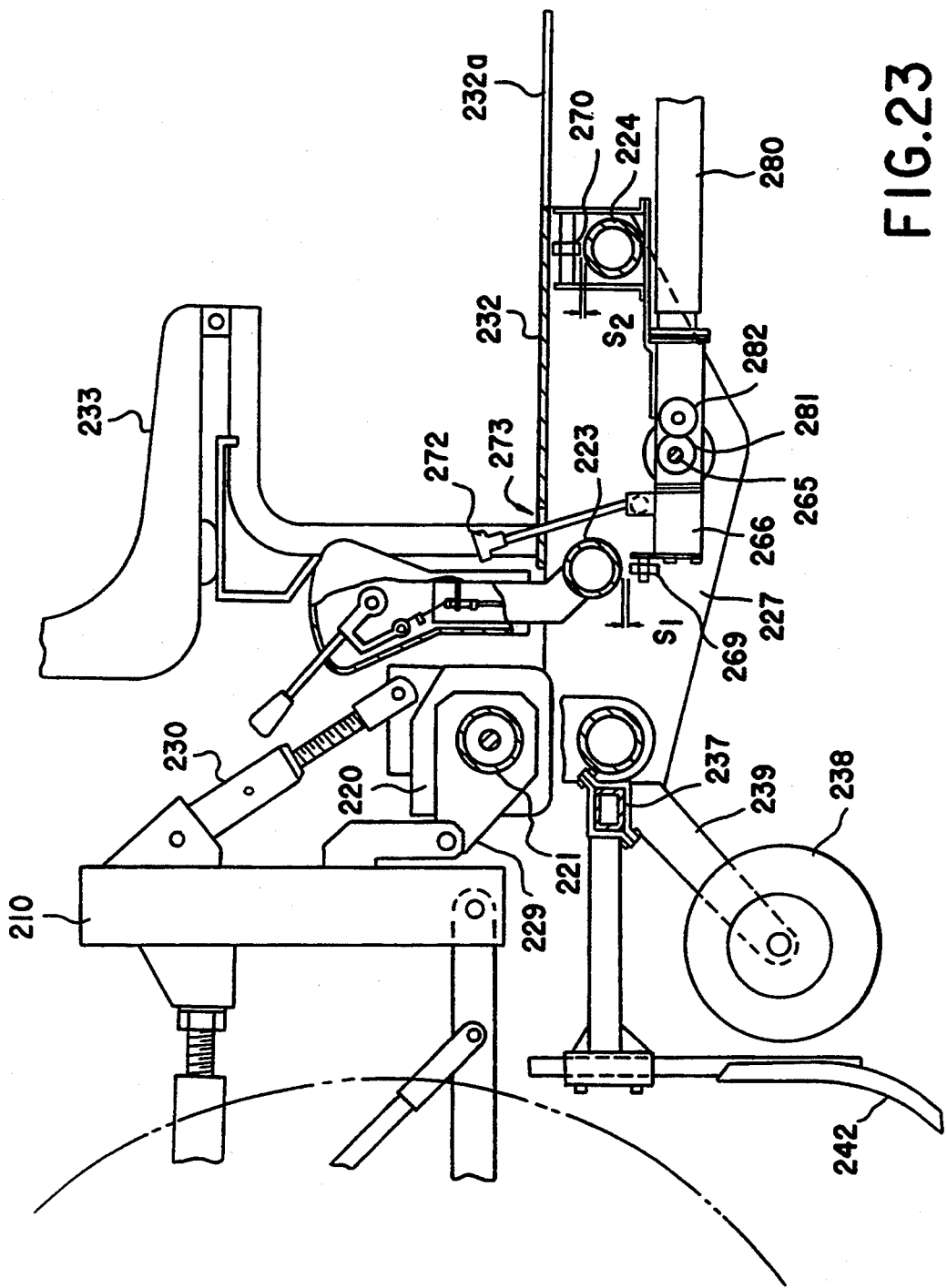
FIG. 23 is the lateral view of the working truck introduced to the vehicular machine embodied by the invention.
Figure 24:
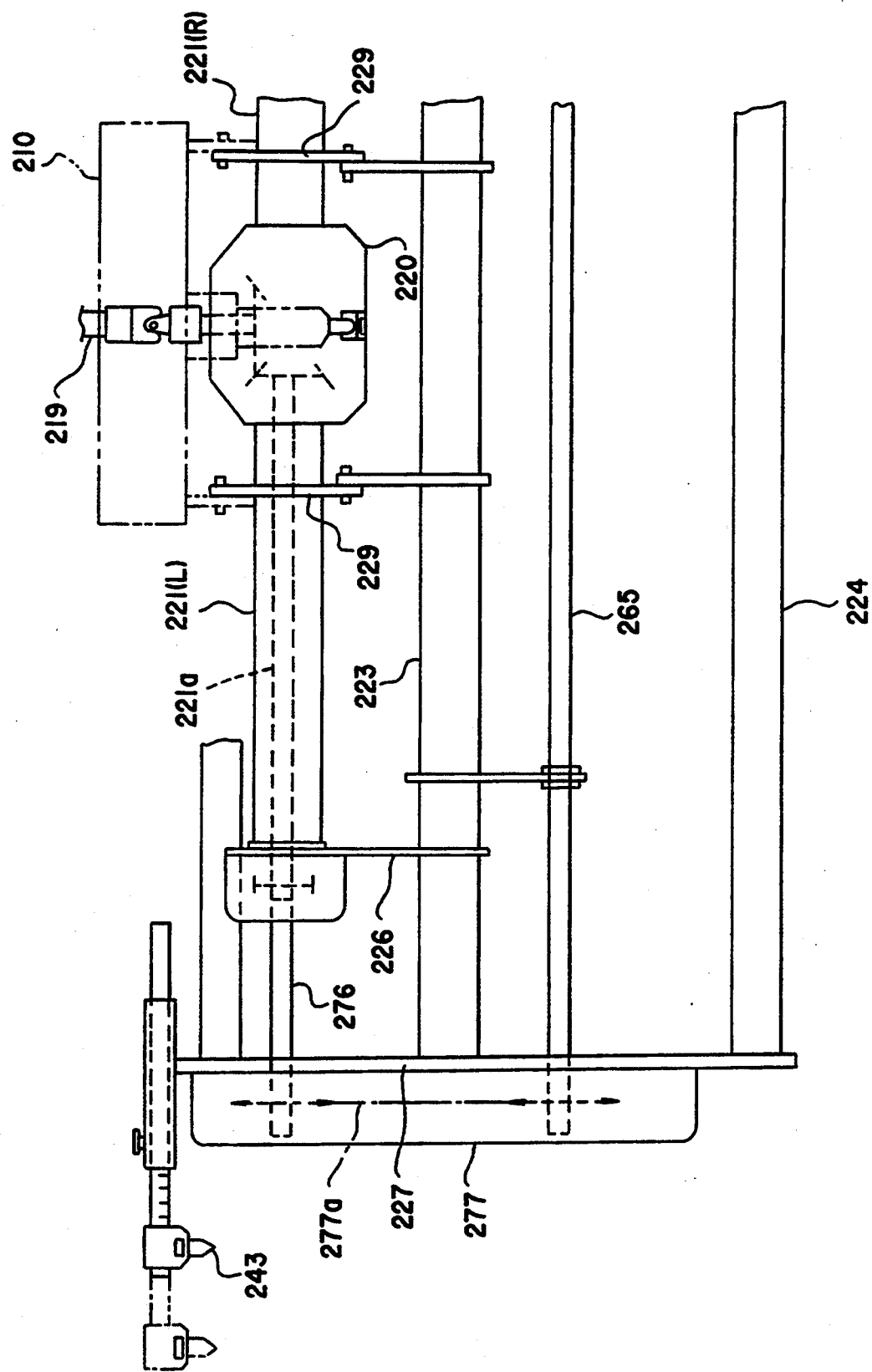
FIG. 24 is the front view of essential components of the working truck of the vehicular machine embodied by the invention.

When operating the vehicular machine 201 according to this embodiment of the invention, if substantial intervals were present between the seedbed field lines, then, as shown in FIG. 20, operator needs to carefully dispose the first through fourth planting units 205 in position in order that the front and back positions of these planting units 205 can correctly be aligned with each other. When applying this alignment, operation for planting vegetal seedlings on respective seedbed lines can be completed at the identical position, and as a result, no blank domain devoid of planted seedling can be generated. When narrowing intervals between planting lines, in order to prevent the adjoining planting units 205 from interfering with each other, as shown in FIG. 21, operator needs to shift the external first and fourth planting units 205 in the front direction until the front end of the seedling mounting table 250 overlaps the upper space of the working step 232, and conversely, operator needs to shift the internal second and third planting unit 205 in the backward direction by a predetermined distance, and then the operator disposes these first through fourth planting units 205 so that these planting units 205 can properly be shifted in the front and backward directions at equal intervals in order of the first, fourth, second, and the third planting unit 205. Since the working step 232 is provided with such a width enough to correspond to that of the truck frame, even when expanding intervals between plating lines to a maximum extent, operator can easily replenish vegetal seedlings to the external first and fourth planting units 205. On the other hand, since the working step 232 is furnished with the extended member 232a, even when narrowing intervals between those planting lines, operator can also easily replenish vegetal seedlings to the rearmost third plant unit 205.

Figure 28:
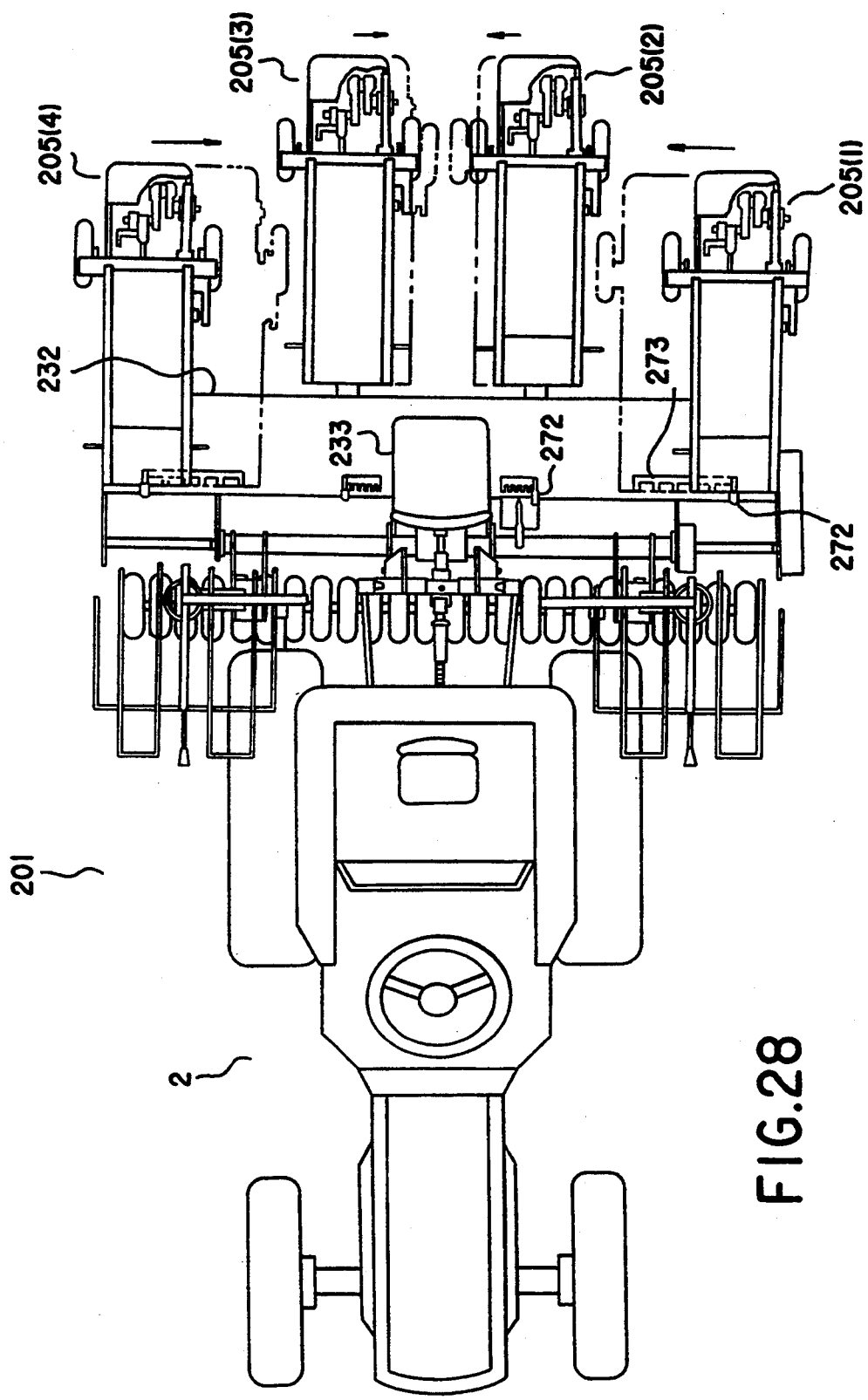
FIG. 28 is the plan of a vehicular machine according to another embodiment of the invention.
Figure 29:
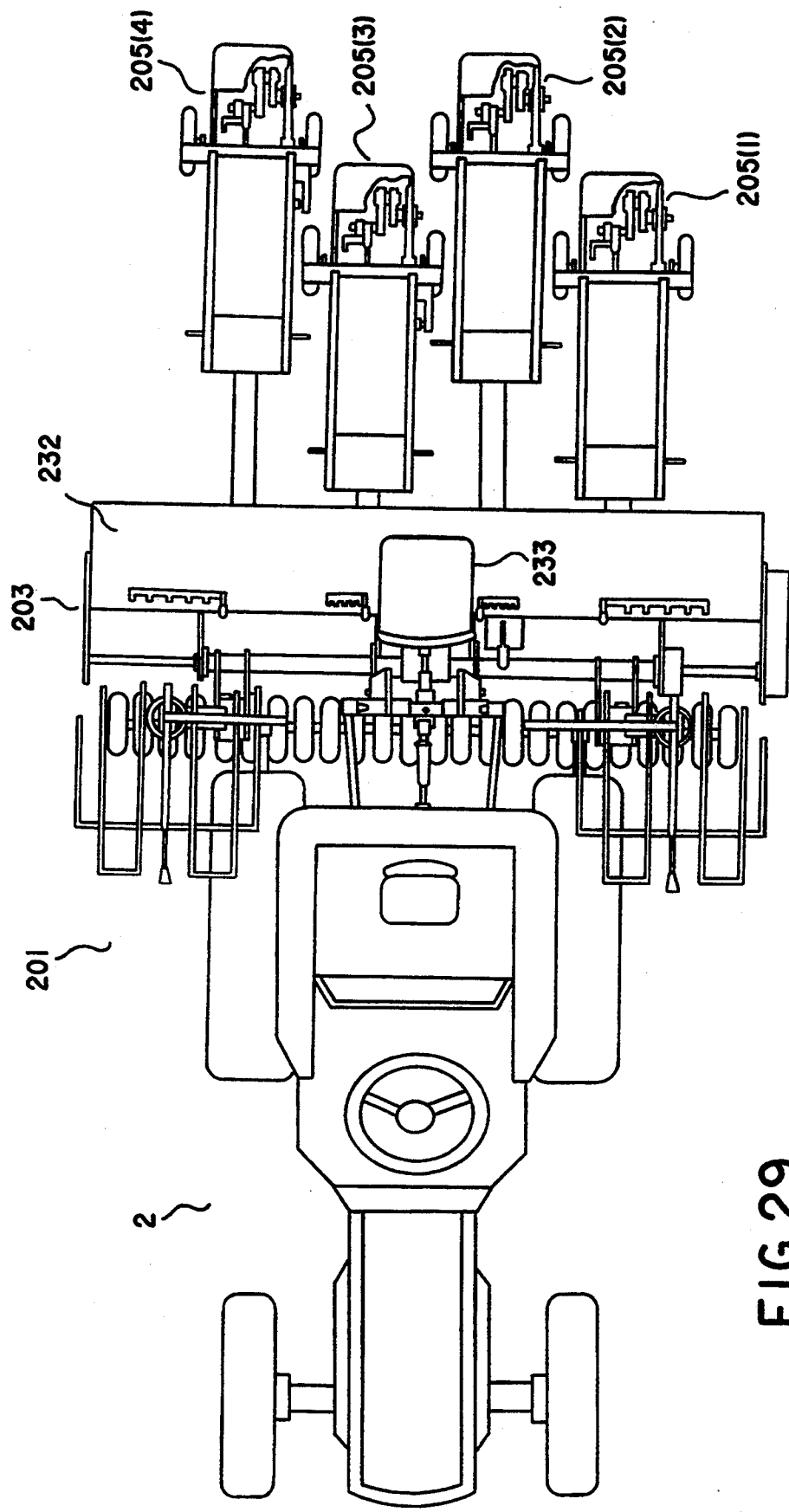
FIG. 29 is the plan of a vehicular machine according to another embodiment of the invention.
Figure 30:
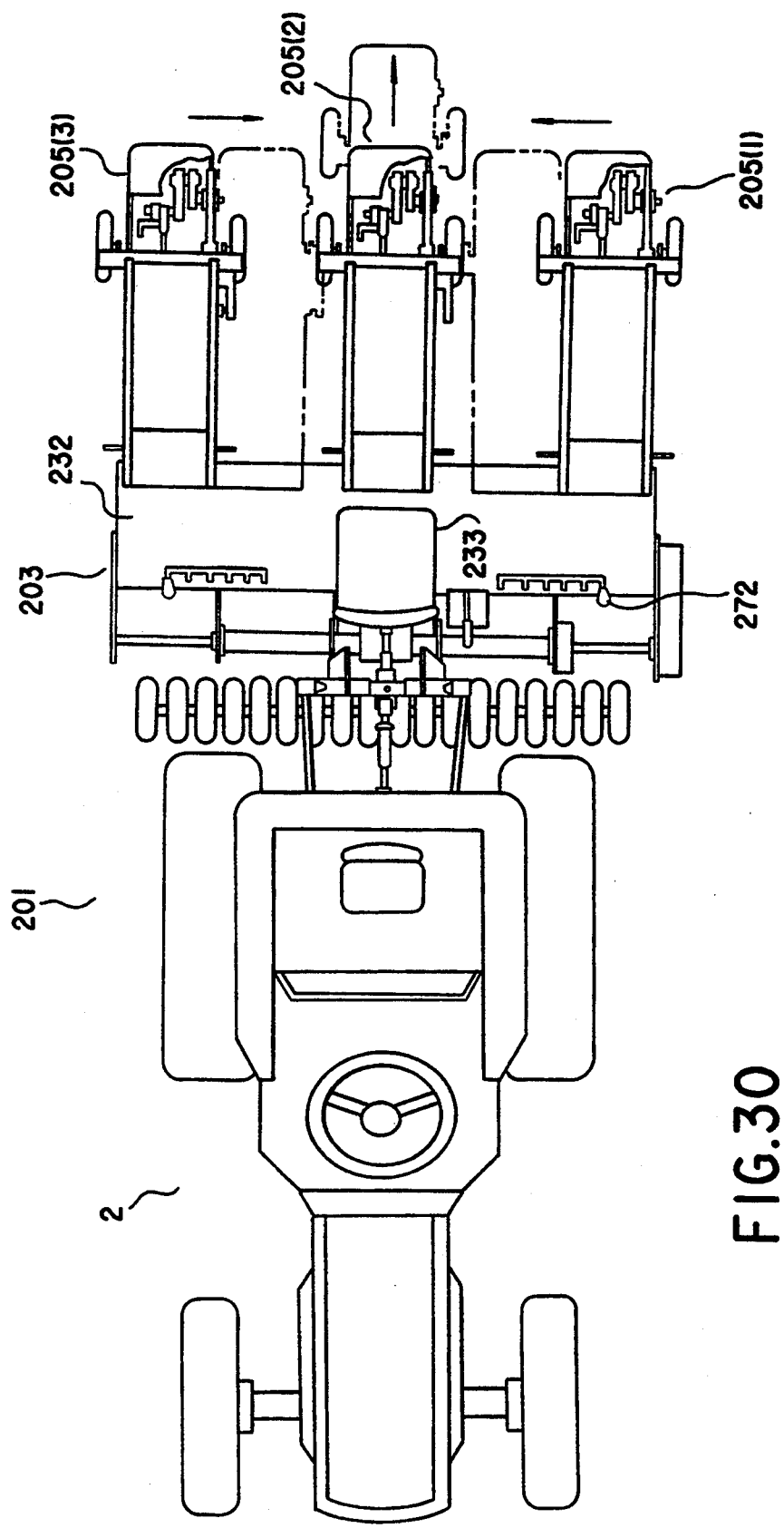
FIG. 30 is the plan of a vehicular machine according to a still further embodiment of the invention.

Furthermore, as shown in FIG. 28, if all the first through fourth planting units 205 were disposed on symmetrical positions to the left and to the right in order to shift the positions of the opposite parties, in other words, the first and fourth planting units 205 in opposition from the second and third planting units 205, in the inverse direction by equal distance, then, this arrangement effectively eliminates balancewise variation caused by shifting movement of the seedling mounting table 250 in the horizontal direction. Furthermore, as shown in FIG. 29, when applying narrow intervals between seedling planting lines, if the first through fourth planting units 205 were disposed by way of alternating with each other in the front and backward directions, discrepancy in the longitudinal direction of these planting units 205 can effectively be minimized. This in turn permits contraction of the total length of those planting units 205. Furthermore, when actually introducing such a vehicular machine designed for transplanting vegetal seedlings on three seedbed lines, as shown with solid line, when substantial intervals are made available between seedbed lines, operator is supposed to align the front and back positions of the first through third planting units 205, and conversely, when narrow intervals are made available between seedbed lines, as shown with chained line, operator merely needs to shift the position of the third planting unit 205 in the center backward.

Industrial applicability of the Invention

Those vehicular machines available for transplanting vegetal seedlings on multiple seedbed field lines according to a variety of embodiment of the invention are ideally suited for effectively planting vegetal seedlings like lettuse or broccoli for example on relatively wide and plane seedbed fields.

What is claimed is:

1. A vehicular machine for transplanting vegetal seedlings on the ground which has a tractive vehicle and a planting unit furnished with a seedling mounting table and a plurality of planting apparatuses for planting vegetal seedlings on said seedling mounting table onto the ground, said vehicular machine further comprising;
   a working truck which is supported by a pair of supporting wheels respectively disposed behind said tractive vehicle, wherein said supporting wheels are aligned on a line identical to front and rear wheels of the tractive vehicle;
   a working step which is disposed on said working truck to permit an operator to mount on said working truck for replenishing vegetal seedlings to the vegetal seedling mounting table of said planting unit; and
   said planting unit is connected to said working truck with a mechanism for lifting and lowering said planting unit, and a level-detecting sensor is provided for said planting unit, said planting unit is lifted and lowered based on the height of the ground surface detected by the level-detecting sensor; wherein said planting unit includes at least one rolling sensor and wherein said planting unit includes at least one pitching sensor.

2. The vehicular machine according to claim 1, wherein there are two pitching sensors and two rolling sensors disposed on an identical oblique line at opposite sides of the planting unit.

3. The vehicular machine according to claim 2, wherein the two pitching sensors are in between said two rolling sensors, and wherein said pitching and said rolling sensors are secured to a sensor fixing rod which is mounted so as to be ascendable and descendable.

4. The vehicular machine according to claim 3, wherein a horizontal sensor is provided for detecting levelness.

5. The vehicular machine according to claim 4, wherein a rake is provided in front of the pitching sensors and the rolling sensors.

6. The vehicular machine according to claim 3, wherein said rolling sensors are respectively provided with a ground pressure sensing switch.

7. A vehicular machine available for transplanting vegetal seedlings on the ground, comprising;
   a planting unit which is furnished with a vegetal seedling mounting table and a plurality of planting apparatuses for planting vegetal seedlings from said vegetal seedling mounting table onto the ground;
   a working step which is disposed on a working truck hauled by a tractive vehicle to permit an operator to mount on said working step of said working truck for replenishing vegetal seedlings to said vegetal seedling mounting table; and
   a first drive force transmission means for transmitting a drive force from said tractive vehicle to proximate the front of said working truck at a level above said working step, a second drive force transmission means for transmitting said drive force from said first drive force transmission means in a downward direction to a level below said working step, and a third drive force transmission means for transmitting said drive force from said second drive force transmission means to said planting unit below said working step.

8. A vehicular machine according to claim 7, wherein a stepless gear-shifting device is provided in the drive-force transmission for transmitting drive force from the tractive vehicle to the planting unit.

9. A vehicular machine according to claim 8, further comprising at least one sensor for detecting the number of rotations of a PTO shaft of the tractive vehicle and a controller which properly controls operation of said stepless gear-shifting device based on the number of the rotations of said PTO shaft detected by said at least one sensor.

10. A vehicular machine for transplanting vegetal seedlings on the ground, comprising;
   a planting unit disposed on the back of a working truck hauled by a tractive vehicle, wherein said planting unit is furnished with a drive-force transmission housing (60), a seedling mounting table (4), and a plurality of planting apparatuses (111); and
   a working step (25) which is disposed on said working truck to permit an operator to mount on said working truck for replenishing vegetal seedlings to said seedling mounting table; and
   wherein said planting unit is furnished with said seedling mounting table above said drive-force transmission housing; and wherein said plurality of planting apparatuses are secured to a planting-apparatus supporting case (62) which extends in a direction upward and rearward from said drive-force transmission housing.

* * * * *